(12) United States Patent
Kobayashi

(10) Patent No.: US 11,263,773 B2
(45) Date of Patent: Mar. 1, 2022

(54) OBJECT DETECTION APPARATUS, OBJECT DETECTION METHOD, COMPUTER PROGRAM PRODUCT, AND MOVING OBJECT

(71) Applicant: KABUSHIKI KAISHA TOSHIBA, Tokyo (JP)

(72) Inventor: Daisuke Kobayashi, Kunitachi Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 16/548,590

(22) Filed: Aug. 22, 2019

(65) Prior Publication Data

US 2020/0302637 A1    Sep. 24, 2020

(30) Foreign Application Priority Data

Mar. 18, 2019  (JP) .............................. JP2019-050504

(51) Int. Cl.
*G06T 7/73* (2017.01)

(52) U.S. Cl.
CPC ...... *G06T 7/73* (2017.01); *G06T 2207/20084* (2013.01)

(58) Field of Classification Search
CPC .................. G06K 9/00664; G06T 7/72; G06T 2207/20084
See application file for complete search history.

(56) References Cited

U.S. PATENT DOCUMENTS

2020/0139973 A1*  5/2020  Palanisamy ............ G06N 5/046

FOREIGN PATENT DOCUMENTS

JP    2018-077829    5/2018

OTHER PUBLICATIONS

A. Piergiovanni, C. Fan, and M. S. Ryoo. Learning latent sub-events in activity videos using temporal attention filters. In Proceedings of the Thirty-First AAAI Conference on Artificial Intelligence (AAAI—17), Jan. 1, 2017. (Year: 2017).*

(Continued)

*Primary Examiner* — Vu Le
*Assistant Examiner* — Tracy Mangialaschi
(74) *Attorney, Agent, or Firm* — Knobbe, Martens, Olson & Bear, LLP

(57) ABSTRACT

According to an embodiment, an object detection apparatus includes a hardware processor. The processor calculates, from an input image, first feature aps in which feature quantities of at least some elements are mutually different. The processor generates, based on a first group of the first feature aps calculated in current instance and based on a second group of the first feature maps calculated in past, a time observation map in which an element having a closer relationship in time direction between the first group and the second group is defined to have proportionally a greater first weighting value. The processor generates second feature maps by weighting each of the first feature maps included in the first group or the second group in accordance with first weighting values indicated in the time observation map. The processor detects an object captured in the input image by using the second feature maps.

8 Claims, 17 Drawing Sheets

(56) References Cited

OTHER PUBLICATIONS

Baradel F, Wolf C, Mille J. Pose-conditioned spatio-temporal attention for human action recognition. arXiv preprint arXiv: 1703.10106. Mar. 29, 2017. (Year: 2017).*
Zhu X, Dai J, Zhu X, Wei Y, Yuan L. Towards high performance video object detection for mobiles. arXiv preprint arXiv:1804.05830. Apr. 16, 2018. (Year: 2018).*
Zhang H, Goodfellow I, Metaxas D, Odena A. Self-Attention Generative Adversarial Networks. arXiv. May 2018: arXiv-1805. (Year: 2018).*
Fan, Heng, et al. "Multi-level contextual rnns with attention model for scene labeling." IEEE Transactions on Intelligent Transportation Systems 19.11 (2018): 3475-3485. (Year: 2018).*
Dollar, Piotr, et al. "The fastest pedestrian detector in the west.". BMVC.2010, 2010, in 12 pages.
Liu Wei,et al. "Ssd: Single shot multibox detector." European conference on computer vision.Springer,Cham,2016, in 17 pages.
Ren, Shaoqing, et al. "Faster R-CNN: Towards Real-Time Object Detection with Region Proposal Networks." Advances in neural information processing systems.2015, in 14 pages.
Christoph Feichtenhofer, et al., "Detect to track and track to detect", ICCV, 2017 in 11 pages.
Xiang Wang, et al., "Non-Local Neural Networks." CVPR, IEEE, 2018, in 10 pages.
A J Piergiovanni et al: "Learning Latent Subevents in Activity Videos Using Temporal Attention Filters", Proceedingsof the Thirty-First AAAI Conference on Artificial Intelligence (AAAI—17), Jan. 1, 2017 (Jan. 1, 2017), pp. 4247-4254, XP055616384, Retrieved from the Internet: URL:https://aaai.org/ocs/index.php/AAAI/AAAI17/paper/viewFile/15005/14307[retrieved on Aug. 29, 2019-29].
Fabien Baradel et al: "Pose-conditioned Spatio-Temporal Attention for Human Action Recognition", arxiv.org, Cornell University Library, 201 Olin Library Cornell University Ithaca, NY 14853, Mar. 29, 2017 (Mar. 29, 2017), XP080752968.
Liu Zhikang et al: "Improving human action recognition by temporal attention", 2017 IEEE International Conference on Image Processing (ICIP), IEEE, Sep. 17, 2017 (Sep. 17, 2017), pp. 870-874, XP033322699, DOI:10.1109/ICIP.2017.8296405 [retrieved on Feb. 20, 2018].
Han Zhang et al: "Self-Attention Generative Adversarial Networks", arxiv.org, Cornell University Library, 201 Olin Library Cornell University Ithaca, NY 14853, May 22, 2018 (May 22, 2018), XP081367707.

* cited by examiner

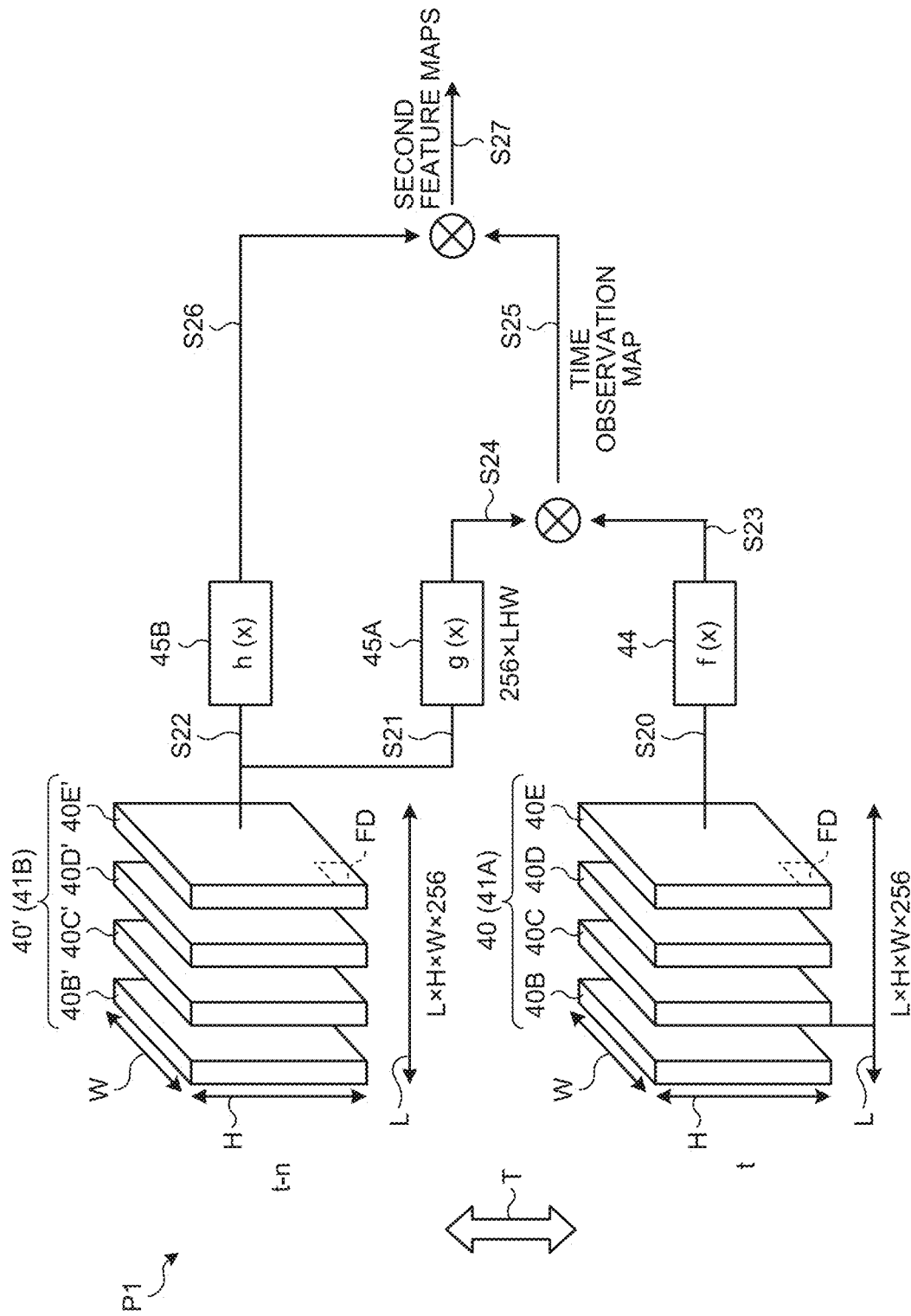

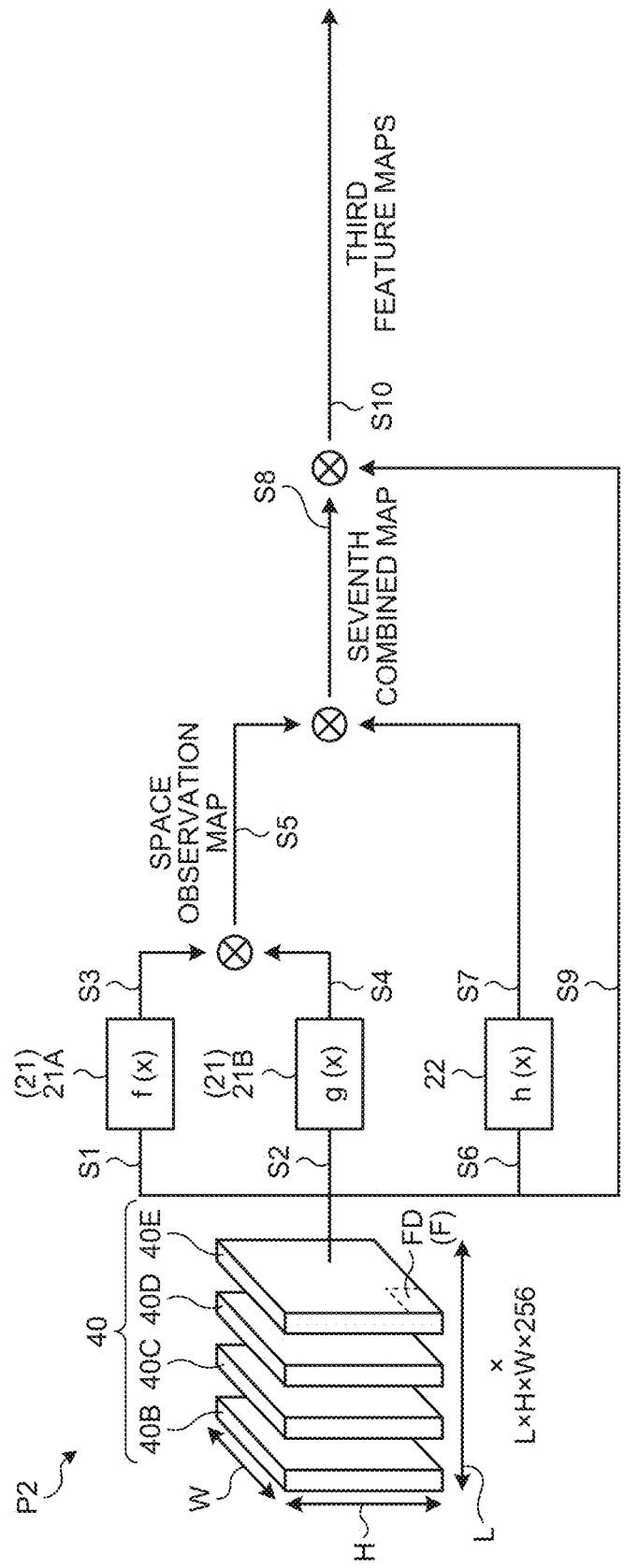

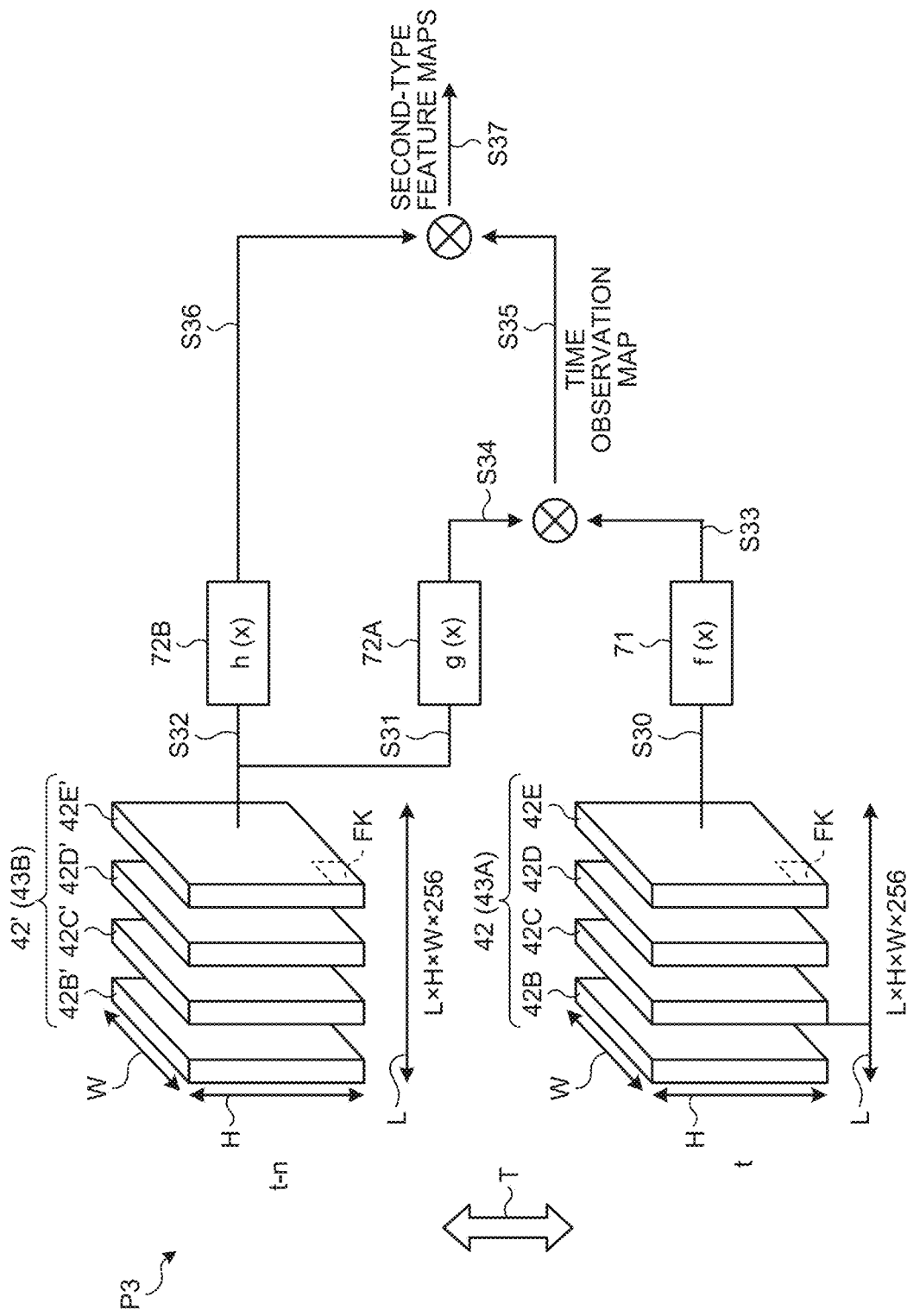

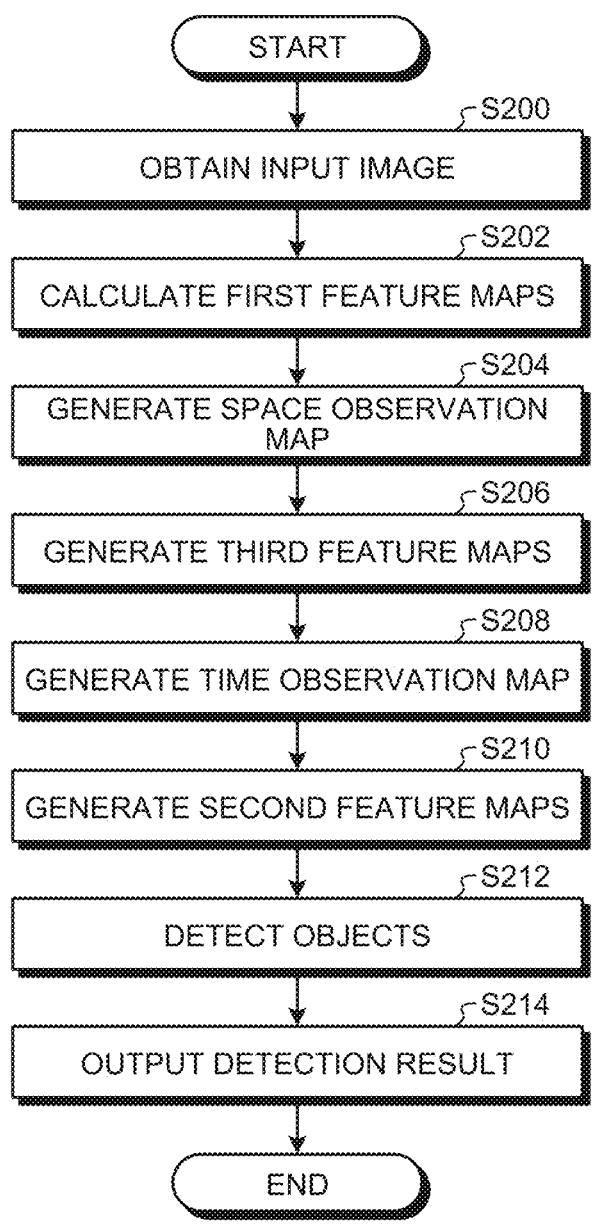

OBJECT DETECTION APPARATUS, OBJECT DETECTION METHOD, COMPUTER PROGRAM PRODUCT, AND MOVING OBJECT

CROSS-REFERENCE TO RELATED APPLICATIONS

This application is based upon and claims the benefit of priority from Japanese Patent Application No. 2019-050504, filed on Mar. 18, 2019, the entire contents of which are incorporated herein by reference.

FIELD

Embodiments described herein relate generally to an object detection apparatus, an object detection method, a computer program product, and a moving object.

BACKGROUND

There is known a technology of detecting objects captured in an input image. For example, a technology is known, in which images having different resolutions are generated from an input image by using a convolution neural network (CNN), and an object is detected by extracting the features from the generated images.

However, in the known technology, the objects are detected simply by combining a plurality of images having different resolutions or by calculating the sum of the included elements. Hence, conventionally, object detection is performed only according to local features, thereby sometimes leading to a decline in the object detection accuracy.

BRIEF DESCRIPTION OF THE DRAWINGS

FIG. 3A is an explanatory diagram for explaining the generation of a time observation map and the generation of second feature maps;

FIG. 8A is an explanatory diagram for explaining the generation of a space observation map and the generation of third feature maps;

FIG. 10A is an explanatory diagram illustrating the generation of a time observation map and the generation of the second feature maps;

FIG. 11 is a flowchart for explaining a flow of the object detection operation;

DETAILED DESCRIPTION

According to an embodiment, an object detection apparatus includes a hardware processor. The processor calculates, from an input image, a plurality of first feature maps in which feature quantities of at least some elements are mutually different. The processor generates, based on a first group of the plurality of first feature maps calculated in current instance and based on a second group of the plurality of first feature maps calculated in past, a time observation map in which an element having a closer relationship in time direction between the first group and the second group is defined to have proportionally a greater first weighting value. The processor generates a plurality of second feature maps by weighting each of the plurality of first feature maps included in the first group or the second group in accordance with first weighting values indicated in the time observation map. The processor detects an object captured in the input image by using the plurality of second feature maps.

Exemplary embodiments of an object detection apparatus, an object detection method, a computer program product, and a moving object are described below in detail with reference to the accompanying drawings.

First Embodiment

Figure 1:
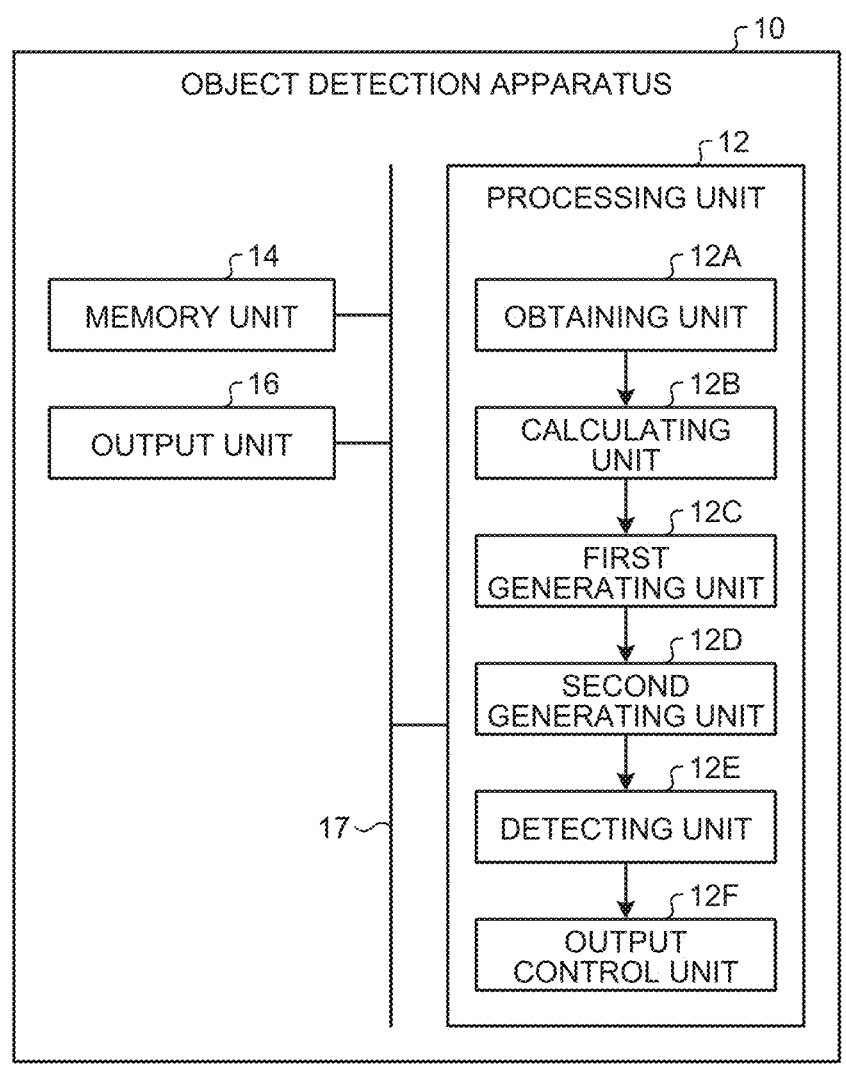
FIG. 1 is a block diagram illustrating a configuration of an object detection apparatus.

FIG. 1 is a block diagram illustrating an exemplary configuration of an object detection apparatus 10 according to a first embodiment.

The object detection apparatus 10 is a device for detecting the objects captured in an input image.

The object detection apparatus 10 includes a processing unit 12, a memory unit 14, and an output unit 16. The processing unit 12, the memory unit 14, and the output unit 16 are connected to each other via a bus 17 in order to be able to send and receive data and signals.

The memory unit 14 stores a variety of data therein. Examples of the memory unit 14 include a random access memory (RAM), a semiconductor memory device such as a flash memory, a hard disk, and an optical disk. Alternatively, the memory unit 14 may be a memory device installed on the outside of the object detection apparatus 10. Still alternatively, the memory unit 14 can be a memory medium. More specifically, the memory medium can be used to store or temporarily store computer programs and a variety of information by downloading them via a local area network (LAN) or the Internet. Moreover, the memory unit 14 can be configured using a plurality of memory mediums.

The output unit 16 is equipped with at least one of the following functions: a display function for displaying a variety of information; a sound output function for outputting sounds; and a communication function for communicating data with external devices. An external device is a device installed on the outside of the object detection apparatus 10 the object detection apparatus 10 and the external devices can be enabled to communicate with each other via a network. For example, the output unit 16 is configured by combining at least either a known display device, or a known speaker, or a known communication device.

The processing unit 12 includes an obtaining unit 12A, a calculating unit 12B, a first generating unit 12C, a second generating unit 12D, a detecting unit 12E, and an output control unit 12F.

The obtaining unit 12A, the calculating unit 12B, the first generating unit 12C, the second generating unit 12D, the detecting unit 12E, and the output control unit 12F are implemented using, for example, one or more processors. For example, the constituent elements can be implemented by executing computer programs in a processor such as a central processing unit (CPU), that is, can be implemented using software. Alternatively, the constituent elements can be implemented using a processor such as a dedicated integrated circuit (IC), that is, can be implemented using hardware. Still alternatively, the constituent elements can be implemented using a combination of software and hardware. In the case of using a plurality of processors, each processor can be configured to implement one of the constituent elements or to implement two or more constituent elements.

Figure 2:
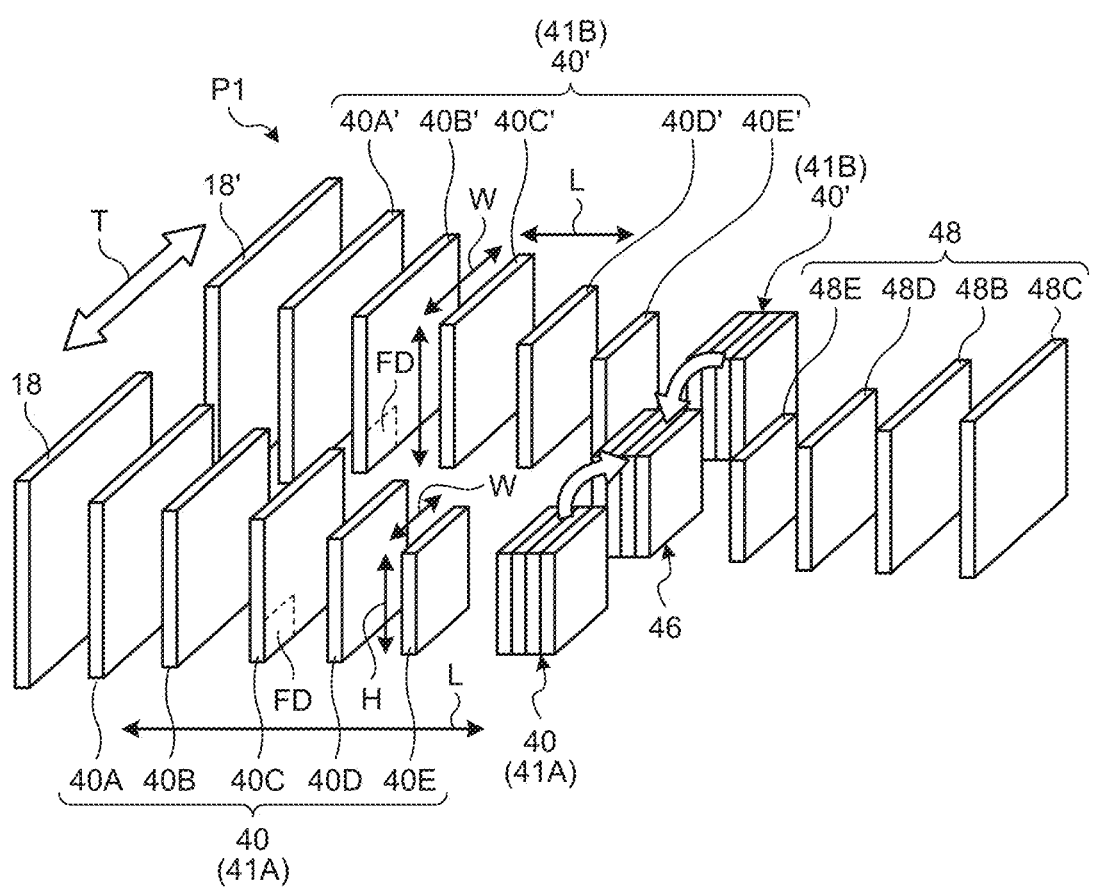
FIG. 2 is an outline diagram illustrating the operations performed by a processing unit.

FIG. 2 is an outline diagram illustrating the operations performed by the processing unit 12 according to the first embodiment. In the first embodiment, the processing unit 12 generates a plurality of first feature maps 40 from an input image 18. Then, the processing unit 12 generates a time observation map 46 using a first group 41A, which represents a group of the first feature maps 40 generated in the current instance, and a second group 41B, which represents a group of the first feature maps 40 generated in the past (referred to as first feature maps 40') from an input image (referred to as an input image 18'). Then, using the time observation map 46, the processing unit 12 performs weighting of the first feature maps 40 (the first feature maps 40') included in the first group 41A (or the second group 41B); and generates second feature maps 48. Subsequently, using the second feature maps 48, the processing unit 12 detects the objects captured in the input image 18. Regarding the first feature maps 40, the time observation map 46, and the second feature maps 48; the detailed explanation is given later.

Returning to the explanation with reference to FIG. 1, given below is the detailed explanation about the constituent elements of the processing unit 12.

The obtaining unit 12A obtains the input image 18. The input image 18 represents image data from which objects are to be detected.

For example, the input image 18 can either be a bitmap image or be a vector image in which a pixel value is defined for each pixel. In the first embodiment, the explanation is given for an example in which the input image 18 is a bitmap image. Meanwhile, when the input image 18 is a vector image, the processing unit 12 can convert it into a bitmap image.

The input image 18 can be stored in advance in the memory unit 14. Then, the obtaining unit 12A can read and obtain the input image 18 from the memory unit 14. Alternatively, the obtaining unit 12A can obtain the input image 18 from an external device or a photographing device via the output control unit 12F. The photographing device is a known device that performs photography and obtains photographed image data. The obtaining unit 12A can receive the photographed image data from the photographing device and obtain the input image 18 represented by the photographed image data.

The calculating unit 12B generates a plurality of first feature maps 40 from the input image 18. For example, as illustrated in FIG. 2, the calculating unit 12B generates the first feature maps 40 from a single input image 18. In FIG. 2, as an example, five first feature maps (a first feature map 40A to a first feature map 40E) are generated. However, as long as a plurality of first feature maps 40 is generated by the calculating unit 12B, there is no restriction on the number of first feature maps 40.

The first feature maps 40 are maps in which the feature quantity is defined for each element FD. Each element FD represents one of a plurality of areas obtained by dividing the first feature maps 40. The size of the elements FD is decided according to the kernel used at the time of generating the first feature maps 40, The kernel is sometimes called a filter. More specifically, the elements FD of the first feature maps 40 correspond to the pixel areas of one or more pixels of the input image 18 that is used as the source of calculation of the first feature maps 40. Meanwhile, in the first embodiment and the embodiments described later, in the case of explaining the elements of the maps in a collective manner, the explanation is given by referring to the elements as elements F.

The feature quantity is a value representing the feature of each element FD, The feature quantity is extracted for each element FD by the kernel used at the time of calculating the first feature maps 40 from the input image 18. For example, the feature quantity is a value in accordance with the pixel value of the corresponding pixel in the input image 18. The extraction of the feature quantity can be performed using a known image processing technology.

In the first feature maps 40, the feature quantities of at least some element FDs are mutually different.

In more detail, for example, in the first embodiment, the first feature maps 40 mutually differ in at least either the resolution or the scale. Herein, differing in the scale implies that at least either the magnification percentage or the reduction percentage is different.

The calculating unit 12B calculates, from a single input image 18, a plurality of first feature maps 40 having at least either mutually different resolutions or mutually different scales. As a result of performing the calculation, the calculating unit 12B generates a plurality of first feature aps 40 in which the feature quantities of at least some elements FD are mutually different.

The calculating unit 12B can implement a known method for calculating a plurality of first feature maps 40 from the input image 18. For example, the calculating unit 12B uses a known convolutional neural network (CNN) and calculates a plurality of first feature maps 40 (the first feature map 40A to the first feature map 40E) from the input image 18.

In this case, the calculating unit 12B performs a known convolution operation in a repeated manner and calculates, as the first feature maps 40, a plurality of tensors obtained from the input image 18.

Alternatively, the calculating unit 12B can perform down sampling feature maps called pooling with respect to the input image 18, and calculate a plurality of first feature maps 40 from the input image 18. Still alternatively, the calculating unit 12B can perform a convolution operation and pooling with respect to the input image 18 in an alternately repeated manner, and calculate a plurality of first feature maps 40.

In the first embodiment, the explanation is given for an example in which the calculating unit 12B uses a CNN and performs a convolution operation in a repeated manner, and calculates a plurality of first feature maps 40 (the first feature map 40A to the first feature map 40E) having at least the resolutions to be mutually different.

As a result, as illustrated in FIG. 2, a plurality of first feature maps 40 (the first feature map 40A to the first feature map 40E) is generated from the input image 18.

Meanwhile, in the first embodiment, every time a plurality of first feature maps 40 is calculated from the input image 18, the calculating unit 123 stores the first feature map 40 in the memory unit 14. Hence, a plurality of first feature maps 40' generated in the past from the input image 18' gets stored in the memory unit 14. As described earlier, the input image 18' represents the input image 18 that was used in the past for calculating the first feature maps 40. Moreover, the first feature maps 40' represent the first feature aps 40 calculated in the past.

Returning to the explanation with reference to FIG. 1, given below is the explanation about the first generating unit 12C. The first generating unit 12C generates the time observation map 46 based on a plurality of first feature maps 40.

The first generating unit 12C generates the time observation map 46 based on the first group 41A, which represents a group of the first feature maps 40 calculated in the current instance by the calculating unit 12B, and the second group 41B, which represents a group of the first feature maps 40' calculated in the past. Herein, the first feature maps 40' as well as the first feature maps 40 represent "first feature maps" calculated by the calculating unit 12B according to the same method, but have at least either different calculation timings or different input images 18 used for the calculation.

FIG. 3A is an explanatory diagram for explaining an example of the generation of the time observation map 46 and the generation of the second feature maps 48.

The time observation map 46 is generated based on the first group 41A and the second group 41B.

Figure 3B:
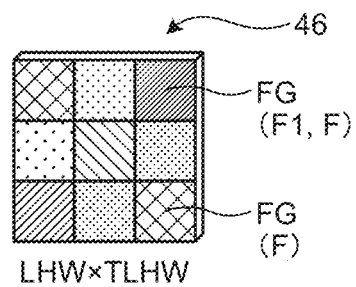
FIG. 3B is a schematic diagram illustrating the time observation map.

FIG. 3B is a schematic diagram illustrating an example of the time observation map 46. In the time observation map 46, a weighting value is defined for each element F. The first generating unit 12C generates the time observation map 46 by obtaining the weighting values of all elements F of the first group 41A and the second group 41B. The weighting values in the time observation map 46 are derived by learning a network and automatically learning the relationship in a time direction T. For that reason, it is indicated that, the greater the weighting value for each element F of the time observation map 46, the closer the relationship in the time direction T; and it is indicated that, the smaller the weighting value for each element F of the time observation map 46, the lower the relationship in the time direction T. In other words, the closer the relationship of an element F in the time direction T, the greater the weighting value (a first weighting value) defined in the generated time observation map 46. On the other hand, the lower the relationship of an element F in the time direction T, the smaller the weighting value defined in the generated time observation map 46.

As illustrated in FIG. 3A, a first space P1 represents the space that includes the time direction T of the first group 41A and the second group 41B. In more detail, the first P1 is a multidimensional space defined by the position direction in the first feature maps 40, the relationship direction among the first feature maps 40, and the time direction T.

The position direction in the first feature maps 40 indicates the direction along the two-dimensional plane representing the embodiment plane of the elements FD of the first feature maps 40. This embodiment plane is equivalent to the embodiment plane of the pixels of the input image 18.

More specifically, the embodiment plane of the elements FD of the first feature map 40 is a two-dimensional plane formed by a first position direction (see the direction of an arrow H) that represents a particular embodiment direction of the elements FD and a second position direction (see the direction of an arrow W) that runs along the embodiment plane of the elements FD of the first feature maps 40 and that is orthogonal to the first position direction. In the following explanation, the first position direction is sometimes referred to as a first position direction H, and the second position direction is sometimes referred to as a second position direction W.

The relationship direction among the first feature maps 40 implies the embodiment direction when the first feature maps 40 are arranged in order of resolution or scale. That is, when a plurality of first feature maps 40 having mutually different resolutions is calculated, the relationship direction is coincident with the direction of increase-decrease of the resolution. Similarly, when a plurality of first feature maps 40 having mutually different scales is calculated, the relationship direction is coincident with the direction of magnification-reduction of the scale. In the example illustrated in FIG. 3A, the relationship direction is coincident with the direction of an arrow L. In the following explanation, the relationship direction is sometimes referred to as a relationship direction L.

Thus, the first space P1 is a three-dimensional space defined by the first position direction H, the second position direction W, the relationship direction L, and the time direction T.

As a result of the generation (learning) performed by the first generating unit 12C, the weighting value of each element F of the time observation map 46 is updated. Herein, a high post-updating weighting value of an element F implies a closer relationship in the first space P1.

In the first embodiment, the first generating unit 12C implements the method explained below and generates the time observation map 46 from the first feature maps 40 belonging to the first group 41A and from the first feature maps 40' belonging to the second group 41B.

In more detail, regarding all elements FD including the elements FD of the first feature maps 40 belonging to the first group 41A and the elements FD of the first feature maps 40° belonging to the second group 41B, the first generating unit 12C calculates the inner product result of the feature quantity vectors oriented along the time direction T, the relationship direction L, and the position directions (the first position direction H and the second position direction W). In the example illustrated in FIG. 3A, there are 256 types of feature quantities.

The first generating unit 12C generates the time observation map 46 in which the inner product result of each element FD is defined as the first weighting value for each element FG (see FIG. 3B).

Alternatively, the first generating unit 12C can generate the time observation map 46 using a combined map that is obtained by linear embedding of the first feature maps 40 belonging to the first group 41A and the first feature maps 40' belonging to the to the second group 41B.

In more detail, tier example, the first generating unit 12C generates a first combined map 44 in which, for each element group of the elements FD that are corresponding among a plurality of first feature maps 40 belonging to the first group 41A (i.e., the first feature map 40B to the first feature map 40E), the feature quantity of each element FD included in the concerned element group is linearly embedded (Step S20).

An element group of the elements FD corresponding among a plurality of first feature maps 40 implies that the pixels of the input image 18, which represents the source for calculating the elements FD belonging to the concerned element group, are the pixels at the same pixel positions. That is, the elements FD belonging to the concerned element group are generated from the pixels at the same pixel positions in the input image 18, and are the elements FD of mutually different first feature maps 40.

Figure 3C:
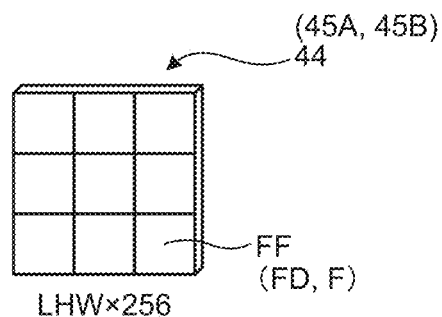
FIG. 3C is a schematic diagram illustrating a first combined map.

FIG. 3C is a schematic diagram illustrating an example of the first combined map 44. Herein, elements FF constituting the first combined map 44 are configured from a group of the elements FD of the first feature maps 40. Thus, the first combined map 44 represents an LHW×256 tensor. Herein, L corresponds to the relationship direction L explained earlier, H corresponds to the first position direction H explained earlier, and W corresponds to the second position direction W explained earlier. Moreover, for each element group of the elements FD corresponding among a plurality of first feature maps 40, the feature quantity of each element FF included in the first combined map 44 represents the value obtained by linear embedding of the feature quantity of one of a plurality of elements FD included in the concerned element group.

In the first embodiment, the first generating unit 12C can generate the first combined map 44 by implementing a known linear embedding method.

Returning to the explanation with reference to FIG. 3A, the first generating unit 12C further generates a second combined map 45A and a third combined map 45B using the first feature maps 40' belonging to the second group 41B (Steps S21 and S22). The generation of the second combined map 45A and the third combined map 45B is identical to the generation of the first combined map 44, except for the fact that the first feature maps 40' are used in place of the first feature maps 40. Herein, from the first feature maps 40' belonging to the second group 41B, the first generating unit 12C generates combined maps having different weight values during linear embedding (i.e., generates the second combined map 45A and the third combined map 45B). Hence, the configuration of the second combined map 45A and the third combined map 45B is identical to the configuration of the first combined map 44 as illustrated in FIG. 3C.

Returning to the explanation with reference to FIG. 3A, "x" represents an element group of the elements FD corresponding among a plurality of first feature maps 40 or the first feature maps 40'. Then, the first combined map 44, the second combined map 45A, and the third combined map 45B that are configured from the elements FF of the concerned element group are expressed as functions using the concerned element group "x". More specifically, for example, the first combined map 44 is expressed as f(x), the second combined map 45A is expressed as g(x), and the third combined map 45B is expressed as h(x).

Then, regarding all elements FD including the elements FD of the first combined map 44 and the elements FD of the second combined map 45A, the first generating unit 12C generates the time observation map 46 in which the inner product result of the vector sequence of the feature quantities along each of the time direction T, the relationship direction L, and the position directions (i.e., the first position direction H and the second position direction W) is defined as a first weighting value (Steps S23, S24, and S25). As a result, the time observation map 46 is generated as illustrated in FIG. 3B.

Meanwhile, the first generating unit 12C uses the known Softmax function, and generates a space observation map 30 using Equation (1) given below.

$$\alpha_{j,i} = \frac{\exp(f(x_{t,i})^T g(x_{t-n,j}))}{\sum_{i=1}^{N} \exp(f(x_{t,i})^T g(x_{t-n,j}))} \quad (1)$$

In Equation (1), $\alpha_{j,i}$ represents the first weighting value defined for each element FG constituting the time observation map 46. Moreover, i represents the LHW position, and j represents the TLHW position. Furthermore, T represents transposition.

Subsequently, for each element FF that is corresponding between the first combined map 44 and the second combined map 45A, the first generating unit 12C substitutes the feature quantity of the concerned element FF in Equation (1). As a result of performing this operation, the first generating unit 12C generates the first weighting value for each element FG of the time observation map 46. Then, the first generating unit 12C generates the time observation map 46 in which the first weighting value is defined for each element FG. As a result, the time observation map 46 represents a LHW× TLHW tensor (see FIG. 3B). Herein, T represents the time direction T. For example, T can be expressed as the number of input images 18 (number of frames) photographed at different timings.

Returning to the explanation with reference to FIG. 1, with respect to each of a plurality of first feature maps 40 (or first feature maps 40') included in the first group 41A (or the second group 41B), the second generating unit 12D performs weighting according to the first weighting values indicated in the time observation map 46; and accordingly generates a plurality of second feature maps 48.

For example, as illustrated in FIG. 3A, the second generating unit 12D makes use of the third combined map 45B obtained by combining the first feature maps 40' belonging to the second group 41B. In more detail, the second generating unit 12D performs weighting of the third combined map 45B using the time observation map 46 (Steps S25 and S26), and generates the second feature maps 48 (Step S27).

For example, with respect to the feature quantity of each element FF included in the third combined map 45B, the second generating unit 12D performs weighting according to the first weighting value defined for the corresponding element FG of the time observation map 46.

In more detail, to the feature quantity of each element FF included in the third combined map 45B, the second generating unit 12D adds or multiplies the first weighting value of the corresponding element FG of the time observation map 46. In the first embodiment, the explanation is given for an example of multiplying the first weighting value. Then, the second generating unit 12D obtains the multiplication result as the post-weighting feature quantity of each element FF. The second generating unit 12D performs the same operation with respect to all elements FF in the third combined map 45B, and generates a fourth combined map 47.

Figure 3D:
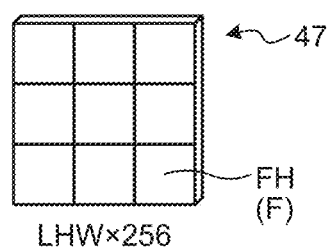
FIG. 3D is a schematic diagram illustrating a fourth combined map.

FIG. 3D is a schematic diagram illustrating an example of the fourth combined map 47. The fourth combined map 47 is configured from a plurality of elements FH, which correspond to the elements FF included in the third combined map 45B. That is, each element FH of the fourth combined map 47 corresponds to one of the element groups of the elements FD corresponding among a plurality of first feature maps 40. Hence, the fourth combined map 47 is an LHW× 256 tensor. Moreover, the elements FH constituting the fourth combined map 47 are defined to have the feature quantities obtained after the weighting has been performed using the time observation map 46.

Then, the second generating unit 12D transforms the fourth combined map 47 into L×H×W×256, and divides the fourth combined map 47 into a plurality of second feature maps 48.

Figure 3E:
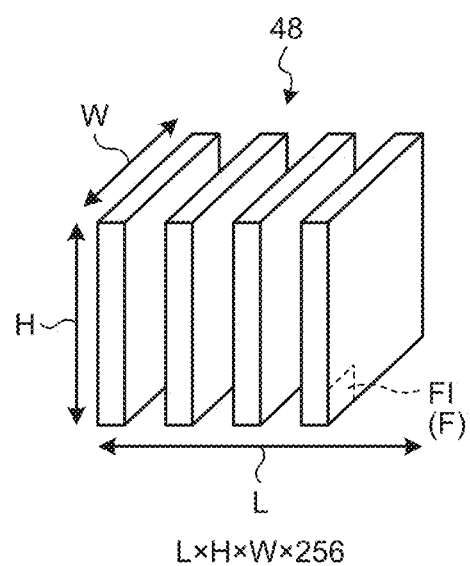
FIG. 3E is a schematic diagram illustrating the second feature maps.

FIG. 3E is a schematic diagram illustrating an example of the second feature maps 48. Herein, elements FI constituting the second feature maps 48 are defined to have values obtained by correcting the feature quantities of the elements FD of the first feature maps 40 using the time observation map 46. In other words, from among the elements FI constituting each of a plurality of second feature maps 48, the feature quantities of the elements FI having a relationship in the time direction T are higher (greater) than the feature quantities of the other elements FI. Moreover, regarding the elements FI constituting the second feature maps 48, the feature quantity are higher in proportion to the closer relationship in the time direction T.

More specifically, the second generating unit 12D can generate the second feature maps 48 using Equation (2) given below.

$$y_j = \sum_{i=1}^{N} \alpha_{j,i} h(x_{t-n,i}) \quad (2)$$

In Equation (2), "$y_j$" represents the value of an element FI of the second feature maps 48. Moreover, $\alpha_{j,i}$, j and i are identical to Equation (1) given earlier. Furthermore, $h(x_{t-n,i})$ represents the value of an element FF of the third combined map 45B.

For each element FF of the third combined map 45B, the second generating unit 12D substitutes the feature quantity of the concerned element FF in Equation (2) given above, and calculates the post-weighting feature quantity of each element FH of the fourth combined map 47. As a result of preforming this operation for each element FH, the second generating unit 12D generates the fourth combined map 47 in which the post-weighting feature quantity is defined for each element FH. Then, the second generating unit 12D transforms the fourth combined map 47 into L×H×W×256, and generates a plurality of second feature maps 48 in which the post-weighting feature quantity is defined for each element FI.

Returning to the explanation with reference to FIG. 1, the detecting unit 12E detects the objects captured in the input image 18 by using the second feature maps 48.

More specifically, the detecting unit 12E detects at least either the positions or the types of the objects captured in the input image 18 by using the second feature maps 48.

The detecting unit 12E can implement a known method and detect the objects in the input image 18 by making use of the second feature maps 48.

For example, using the second feature maps 48, the detecting unit 12E implements a known method and estimates the positions of the objects and identifies the classes to which the objects belong. At the time of performing position estimation and class identification, in order to adjust the number of channels (the number of types of feature quantities) of the second feature maps 48 or to adjust the size of the second feature maps 48, a known convolution operation and a known resizing operation can be performed. After the convolution operation and the resizing operation have been performed, the detecting unit 12E can detect the objects using the second feature maps 48.

Meanwhile, in order to perform object position estimation and class identification, with respect to each element F of the first feature maps 40, the detecting unit 12E can directly perform class identification of the objects and perform regression of the areas occupied by the objects, as in the case of a single shot multibox detector (SSD), for example. Alternatively, as in the case of Faster R-CNN, the detecting unit 12E can extract candidate areas representing candidates of an object from the second feature maps 48 and, for each candidate area, can perform class identification of the object and perform regression of the area occupied by the object. These operations can be performed by implementing the method disclosed in Publication 1 or Publication 2 given below, for example.

Publication 1: Liu Wei, et al. "Ssd: Single shot multibox detector." European conference on computer vision. Springer, Cham, 2016.

Publication 2: Ren, Shaoqing, et al. "Faster r-cnn: Towards real-time object detection with region proposal networks." Advances in neural information processing system. 2015.

Meanwhile, there is no restriction on the objects to be detected by the detecting unit 12E. Examples of the objects include vehicles, persons, and obstacles. However, those are not the only possible examples.

Given below is the explanation about the output control unit 12F. The output control unit 12F outputs the object detection result, which is obtained by the detecting unit 12E, to the output unit 16.

When the output unit 16 has a sound output function, it outputs a sound indicating the object detection result. When the output unit 16 has a communication function, it sends information indicating the object detection result to an external device via a network.

When the output unit 16 has a display function, it displays a display image indicating the object detection result.

Figure 4:
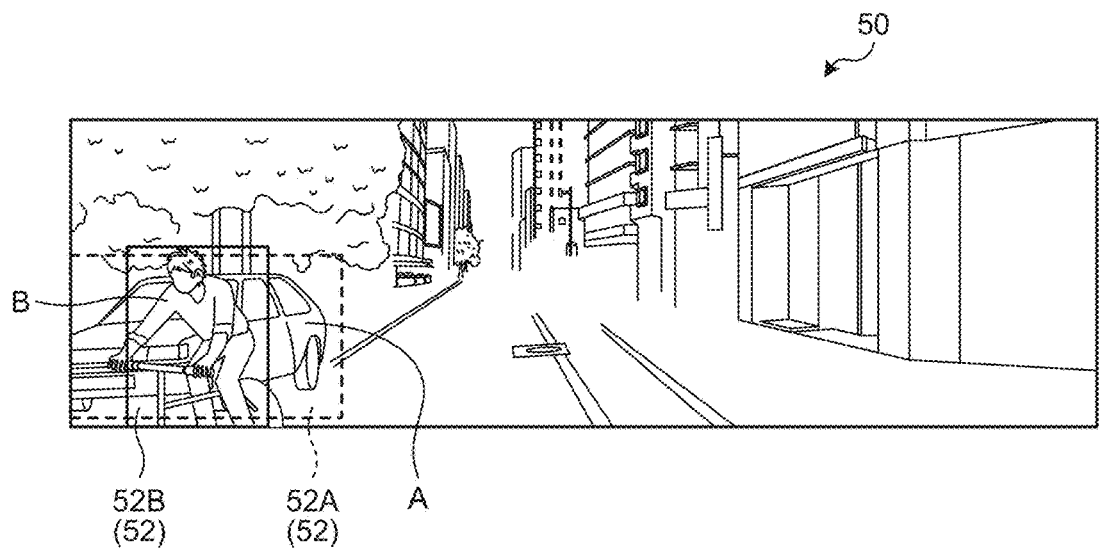
FIG. 4 is a schematic diagram illustrating a display image.

FIG. 4 is a schematic diagram illustrating an example of a display image 50. For example, the output unit 16 displays the display image 50. Moreover, the display image 50 includes sets of object information 52. The object information 52 represents information about the objects detected by the detecting unit 12E. In other words, the object information 52 represents information indicating the detection result obtained by the detecting unit 12E. In FIG. 4, as an example, the display image 50 includes object information 52A indicating an object A and includes object information 52B indicating an object B. For example, the output control unit 12F can generate the display image 50 illustrated in FIG. 4, and can display it in the output unit 16.

Meanwhile, the output form of the object information 52 is not limited to the form illustrated in FIG. 4. Alternatively, examples of the object information 52 include frame borders indicating the object information 52, characters indicating the object information 52, and a highlighted display image in which the objects represented by the object information 52 are highlighted.

Given below is the explanation of a sequence of operations in an object detection operation performed by the object detection apparatus 10.

Figure 5:
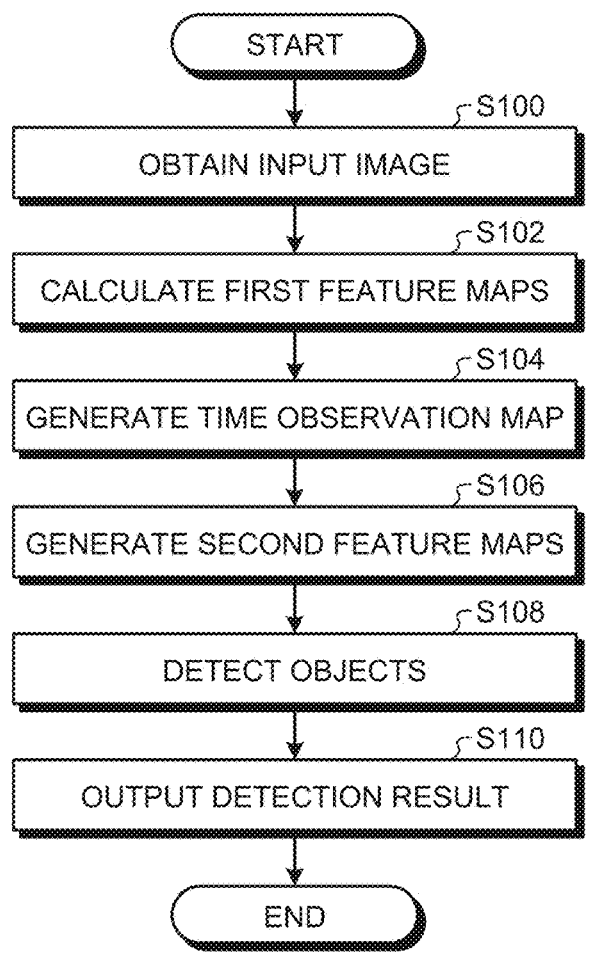
FIG. 5 is a flowchart for explaining a flow of an object detection operation.

FIG. 5 is a flowchart for explaining an exemplary flow of the object detection operation performed by the object detection apparatus 10.

The obtaining unit 12A obtains the input image 18 (Step S100).

Then, the calculating unit 12B calculates a plurality of first feature maps 40 from the input image 18 obtained at Step S100 (Step S102). For example, the calculating unit 12B uses a CNN and performs a convolution operation in a repeated manner so as to calculate a plurality of first feature maps 40 from the input image 18.

The first generating unit 12C generates the time observation map 46 using the first group 41A of the first feature maps 40, which are calculated in this instance at Step S102, and the second group 41B of the first feature maps 40', which were calculated in the past (Step S104).

Subsequently, with respect to the first feature maps 40 (or the first feature maps 40') belonging to the first group 41A (or the second group 41B), the second generating unit 12D performs weighting according to the first weighting values indicated in the time observation map 46; and generates a plurality of second feature maps 48 (Step S106).

Then, the detecting unit 12E detects the objects captured in the input image by using the second feature maps 48 (Step S108).

Subsequently, the output control unit 12F outputs the object detection result, which is obtained at Step S108, to the output unit 16 (Step S110). It marks the end of the present routine.

As described above, the object detection apparatus 10 according to the first embodiment includes the calculating unit 12B, the first generating unit 12C, the second generating unit 12D, and the detecting unit 12E. The calculating unit 12B calculates, from the input image 18, a plurality of first feature maps 40 in which the feature quantities of at least some elements FD are mutually different. Then, based on the first group 41A of the first feature maps 40 calculated in this instance and based on the second group 41B of the first feature maps 40' calculated in the past, the first generating unit 12C generates the time observation map 46 in which the elements having a closer relationship in the time direction T between the first group 41A and the second group 41B are defined to have a proportionally high first weighting value. Subsequently, with respect to the first feature maps 40 (or the first feature maps 40') included in the first group 41A (or the second group 41B), the second generating unit 12D performs weighting according to the first weighting values indicated in the time observation map 46, and generates the second feature maps 48. Then, the detecting unit 12E detects the objects captured in the input image 18 by using the second feature maps 48.

In the conventional technology, the objects are detected by combining a plurality of images having different resolutions or by calculating the sum of the included elements. More specifically, a technology called an image pyramid method is known in which the scale is kept fixed and the features are extracted from a plurality of images having mutually different resolutions. However, in the image pyramid method, the features need. to be extracted independently from each image having a different resolution, thereby resulting in a large processing load. In that regard, as a substitute for the image pyramid method, a technology has been disclosed in which a plurality of feature maps representing a plurality of intermediate layers generated in a CNN are used in object detection. For example, the intermediate layers to be used in object detection are selected according to the size of the detection target, and object detection is performed using a map formed by combining the selected intermediate layers.

In the conventional technology, object detection is performed by combining a plurality of intermediate layers or by using the calculation result of the sum of the elements of a plurality of intermediate layers. In this way, in the conventional technology, object detection is performed only according to local features, thereby sometimes leading to a decline in the object detection accuracy.

In contrast, the object detection apparatus 10 according to the first embodiment generates the time observation map 46 in which high weighting values are proportionally defined for the elements having a closer relationship in the time direction T among the first group 41A, which includes a plurality of first feature maps 40 calculated in this instance, and the second group 41B, which includes a plurality of first feature maps 40' calculated in the past. Then, the object detection apparatus 10 uses the time observation map 46 for performing weighting of the first feature maps 40, and generates the second feature maps 48. Subsequently, the object detection apparatus 10 uses the second feature maps 48 for detecting objects.

In this way, the object detection apparatus 10 according to the first embodiment performs object detection using the second feature maps 48 that are obtained by raising (increasing) the feature quantities of such areas in the first feature maps 40 which are important in the time direction T. Hence, as compared to the conventional technology, as a result of taking into account the relationship in the time direction T, the object detection apparatus 10 according to the first embodiment can perform object detection according to broader features.

Thus, the object detection apparatus 10 according to the first embodiment ab s achieving enhancement in the object detection accuracy.

Second Embodiment

In a second embodiment, the explanation is given about performing object detection using third feature maps that further take into account a second spatial relationship that is defined by the first position direction H, the relationship direction L, and the second position direction W.

Meanwhile, in the second embodiment, the configuration identical to the first embodiment is referred to by the same reference numerals, and the detailed explanation is not repeated.

Figure 6:
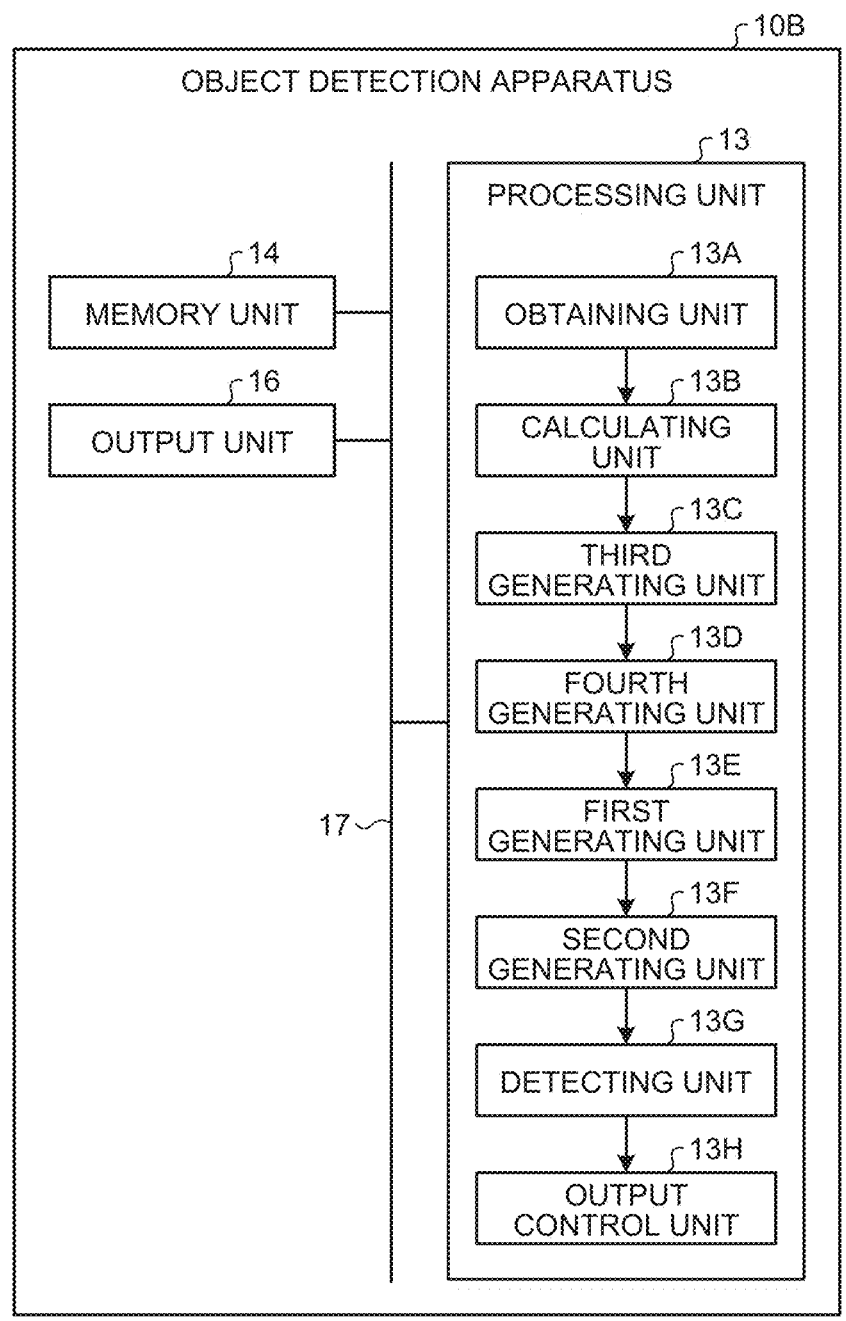
FIG. 6 is a block diagram illustrating a configuration of an object detection apparatus.

FIG. 6 is a block diagram illustrating an exemplary configuration of an object detection apparatus 10B according to the second embodiment.

The object detection apparatus 10B includes a processing unit 13, the memory unit 14, and the output unit 16. The processing unit 13, the memory unit 14, and the output unit 16 are connected to each other via the bus 17 in order to be able to send and receive data and signals. Thus, except for the fact that the processing unit 13 is substituted for the processing unit 12, the object detection apparatus 10B is the same as the object detection apparatus 10 according to the first embodiment.

The processing unit 13 includes an obtaining unit 13A, a calculating unit 13B, a third generating unit 13C, a fourth generating unit 13D, a first generating unit 13E, a second generating unit 13F, a detecting unit 13G, and an output control unit 13H.

The obtaining unit 13A, the calculating unit 13B, the third generating unit 13C, the fourth generating unit 13D, the first generating unit 13E, the second generating unit 13F, the detecting unit 13G, and the output control unit 13H are implemented using, for example, one or more processors. For example, the constituent elements can be implemented by executing computer programs in a processor such as a CPU, that is, can be implemented using software. Alternatively, the constituent elements can be implemented using a processor such as a dedicated integrated circuit (IC), that is, can be implemented. using hardware. Still alternatively, the constituent elements can be implemented using a combination of software and hardware. In the case of using a plurality of processors, each processor can be configured to implement one of the constituent elements or to implement two or more constituent elements.

Figure 7:
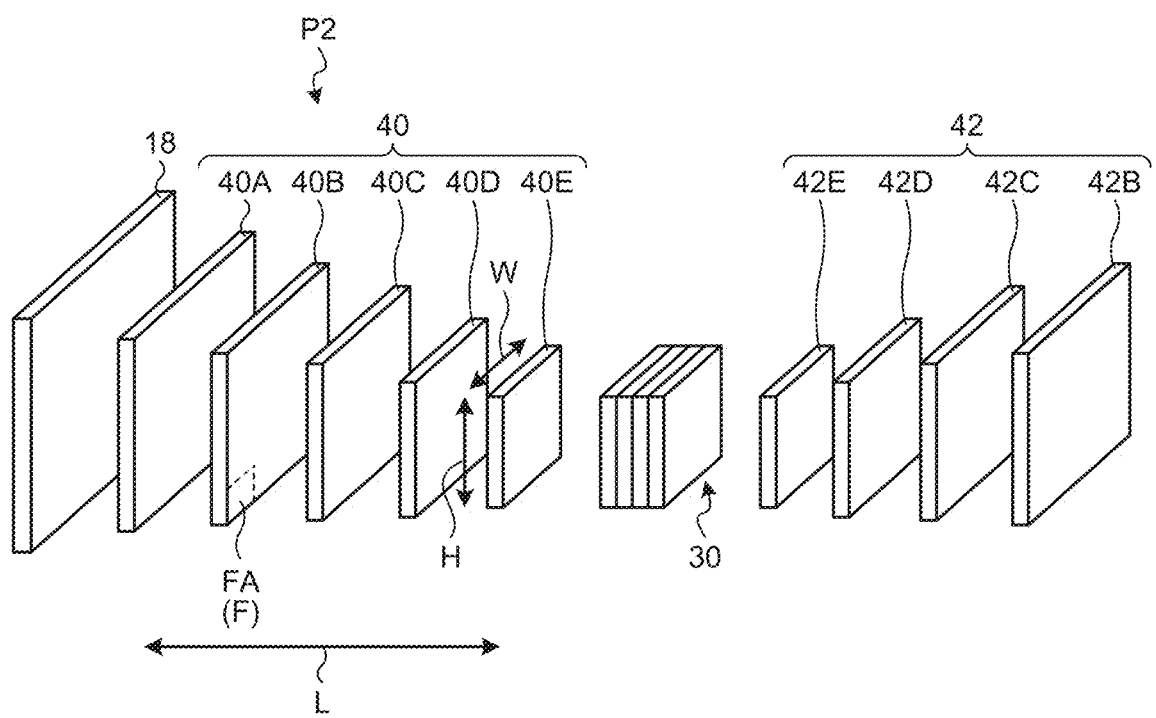
FIG. 7 is an outline diagram illustrating the operations performed by a processing unit.

FIG. 7 is an outline diagram illustrating the operations performed by the processing unit 13 according to the second embodiment.

In the second embodiment, in an identical manner to the first embodiment, the processing unit 13 calculates a plurality of first feature maps 40. Then, the processing unit 13 generates a space observation map 30 using the first feature maps 40. Subsequently, the processing unit 13 performs weighting of the first feature maps 40 using the space observation map 30, and generates third feature aps 42.

Then, using the third feature maps 42 generated in this instance and the third feature maps 42 generated in the past, the processing unit 13 generates the time observation map 46 in an identical manner to the first embodiment. Subsequently, the processing unit 13 corrects the feature quantities of the elements of the third feature maps 42 using the time observation map 46, and generates the second feature maps 48. Then, the processing unit 13 detects objects using the second feature maps 48.

Regarding the space observation map 30 and the third feature maps 42, the detailed explanation is given later.

Returning to the explanation with reference to FIG. 6, given below is the detailed explanation of the constituent elements of the processing unit 13.

The obtaining unit 13A and the calculating unit 13B are identical to the obtaining unit 12A and the calculating unit 12B, respectively, according to the first embodiment.

That is, the obtaining unit 13A obtains the input image 18, The calculating unit 13B generates a plurality of first feature maps 40 from the input image 18.

The following explanation is given about the third generating unit 13C. The third generating unit 13C generates the space observation map 30 based on the first feature maps 40. Herein, as long as a plurality of first feature maps 40 is used in generating the space observation map 30, it serves the purpose. Hence, there is no restriction on the generating unit 13C to use all first feature maps 40 calculated by the calculating unit 12B. In the second embodiment, the explanation is given for an example in which, from among the first feature maps 40 (the first feature map 40A to the first feature map 40E) calculated by the calculating unit 12B, the third generating unit 13C uses some of the first feature maps 40 (the first feature map 40B to the first feature map 40E) in generating the space observation map 30.

FIG. 8A is an explanatory diagram for explaining an example of the generation of the space observation map 30 and the generation of the third feature maps 42.

As illustrated in FIG. 8A, the third generating unit 13C generates the space observation map 30 from a plurality of first feature maps 40 (the first feature map 40B to the first feature map 40E).

Figure 8B:
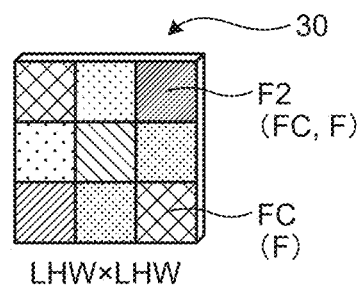
FIG. 8B is a schematic diagram illustrating the space observation map.

FIG. 8B is a schematic diagram illustrating an example of the space observation map 30. In the space observation map 30, a weighting value is defined for each element F of LHW×LHW. The weighting value of each element of the space observation map 30 is updated by the generation (learning) performed by the third generating unit 13C. In the space observation map 30, high post-updating weighting values of the elements F imply a closer relationship in a second space P2. Hence, after the updating, that is, regarding each element F in the generated space observation map 30, a high weighting value (a second weighting value) is defined in proportion to the closer relationship of the element F in the second space P2. In other words, in the space observation map 30, to second elements F2 representing the elements F having a relationship in the second space P2, second weighting values are defined that are higher than the weighting values defined for the elements F other than the second elements F2. Moreover, in the space observation map 30, the lower the relationship of an element F in the second space P2, the smaller the weighting value defined for it.

As illustrated in FIG. 8A, the second space P2 is a multidimensional space defined by the position directions in the first feature maps 40 and the relationship direction L among the first feature maps 40. Herein, the definition of the position directions and the relationship direction L is identical to the first embodiment. Thus, the second space P2 is a three-dimensional space defined by the first position direction H, the second position direction W, and the relationship direction L.

As a result of the generation (learning) performed by the third generating unit 13C, the weighting value for each element F in the space observation map 30 is updated. Herein, high post-updating weighting values of the elements F imply a closer relationship in the second space P2.

In the second embodiment, the third generating unit 13C generates the space observation map 30 from the first feature maps 40 according to the method described below.

More specifically, for each element group of the elements FD corresponding among a plurality of first feature maps 40, the third generating unit 13C calculates the inner product result of the vector sequence of the feature quantities along each of the relationship direction L and the position directions (i.e., the first position direction H and the second position direction W).

In the second embodiment, the explanation is given for an example in which there are 256 types of feature quantities. The number of types of feature quantities is sometimes called the number of channels. Meanwhile, the types of feature quantities are not limited to 256. When there are 256 types of feature quantities, the third generating unit 13C calculates the inner product result of the vector sequence of the feature quantities along each of the first position direction H, the second position direction W, and the relationship direction L.

Then, the third generating unit 13C generates the space observation map 30 in which the inner product result of each element FD is defined as the second weighting value for each element FC.

Hence, for example, the space observation map 30 is generated as illustrated in FIG. 8B, As described above, in the space observation map 30, a weighting value is defined for each element FC. The weighting value of each element FC (the second weighting value) in the space observation map 30 is updated by the generation (learning) performed by the third generating unit 13C. In the space observation map 30, higher post-updating weighting values of the elements FC imply a closer relationship in the second space P2.

Returning to the explanation with reference to FIG. 8A, the third generating unit 13C can generate the space observation map 30 using a plurality of combined maps obtained by performing linear embedding of a plurality of first feature maps 40 using mutually different weight values. As a result of generating the space observation map 30 using a plurality of combined maps, it becomes possible to enhance the accuracy of the space observation map 30.

More specifically, for example, the third generating unit 13C generates a fifth combined map 21 in which, for each element group of the elements FD corresponding among a plurality of first feature maps 40 (the first feature map 40B to the first feature map 40E), the feature quantity of each element FD included in that element group is linearly embedded.

Figure 8C:
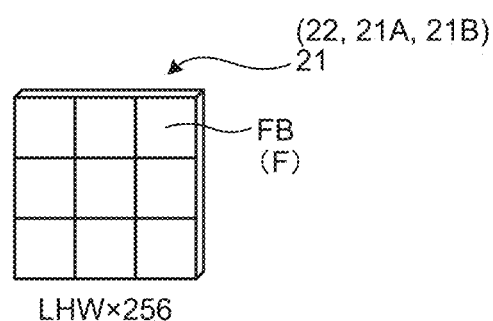
FIG. 8C is a schematic diagram illustrating a fifth combined map.

FIG. 8C is a schematic diagram illustrating an example of the fifth combined map 21. Herein, elements FB constituting the fifth combined map 21 are configured from element groups of the elements FD corresponding among the first feature maps 40.

Hence, the fifth combined map 21 is an LHW×256 tensor. Herein, L corresponds to the relationship direction L explained earlier, H corresponds to the first position direction H explained earlier, and W corresponds to the second position direction W explained earlier. Moreover, for each element group of the elements FD corresponding among a plurality of first feature maps 40, the feature quantity of each element FB included in the fifth combined map 21 represents the value obtained by linear embedding of the feature quantity of one of a plurality of elements FD included in the concerned element group.

In the second embodiment, the third generating unit 13C can generate the fifth combined map 21 by implementing a known linear embedding method.

Returning to the explanation with reference to FIG. 8A, in the second embodiment, the third generating unit 13C generates, from a plurality of first feature maps 40, a plurality of fifth combined maps 21 (a fifth combined map 21A and a fifth combined map 21B) having mutually different weight values during linear embedding. The fifth combined map 21A and the fifth combined map 21B have an identical configuration to the fifth combined map 21 illustrated in FIG. 8C.

Herein, "x" represents each element group of the elements FD corresponding among a plurality of first feature maps 40. Then, the fifth combined maps 21 configured. from the elements FB of the concerned element group are expressed as functions using the concerned element group "x" of the first feature maps 40. More specifically, for example, the fifth combined map 21A is expressed as f(x) and the fifth combined map 21B is expressed as g(x).

Then, the third generating unit 13C generates the space observation map 30 in which, for each element FB corresponding among a plurality of fifth combined maps 21 (the fifth combined map 21A and the fifth combined map 21B), the inner product result of the vector sequence of the feature quantities along each of the relationship direction L and the position directions(i.e., the first position direction H and the second position direction W) is defined as a second weighting value (Steps S3, S4, and S5).

For example, the third generating unit 13C uses the known Softmax function, and generates the space observation map 30 using Equation (3) given below.

$$\alpha_{j,i} = \frac{\exp(f(x_i)^T g(x_j))}{\sum_{i=1}^{N} \exp(f(x_i)^T g(x_j))} \quad (3)$$

In Equation (3), $\alpha_{j,i}$ represents an LHW×LHW tensor. Moreover, $f(x_i)$ and $g(x_j)$ represent LHW×256 tensors. Furthermore, "T" in $f(x_i)^T$ represents transposition of $f(x_i)$, and represents a 256×LHW tensor. Moreover, "i, j" represents the position of LHW.

For each element FB corresponding among the fifth combined map 21A and the fifth combined map 21B, the third generating unit 13C substitutes the feature quantity of the concerned element FB in Equation (3). As a result of performing this operation, the third generating unit 13C calculates the second weighting value for each element FC of the space observation map 30. Then, the third generating unit 13C generates the space observation map 30 in which a second weighting value is defined for each element FC. As a result, the space observation map 30 becomes an LHW×LHW tensor (see FIG. 8B).

Returning to the explanation with reference to FIG. 6, with respect to each first feature map 40, the fourth generating unit 13D performs weighting according to the second weighting values indicated in the space observation map 30. As a result of performing this operation, the fourth generating unit 13D generates the third feature maps 42 corresponding to the first feature maps 40.

Explained below with reference to FIG. 8A, for example, the fourth generating unit 13D generates a sixth combined map 22 from a plurality of first feature maps 40 (Step S6). In an identical manner to the generation of the fifth combined maps 21, the fourth generating unit 13D generates the sixth combined map 22 from a plurality of first feature maps 40. At that time, the fourth generating unit 13D generates the sixth combined map 22 by performing linear embedding using different weight values than the weight values used in the fifth combined maps 21. Hence, as illustrated in FIG. 8C, the sixth combined map 22 represents a combined map in which the element group of the elements FD corresponding among a plurality of first feature maps 40 is defined as a single element FB.

Returning to the explanation with reference to FIG. 8A, "x" represents each element group of the elements FD corresponding among a plurality of first feature maps 40. Then, the sixth combined map 22 configured from the elements FB representing element groups is expressed using a function in which the element group "x" of the first feature maps 40 is used. More specifically, for example, the sixth combined map 22 is expressed as h(x).

Then, as illustrated in FIG. 8A, the fourth generating unit 13D performs weighting of the sixth combined map using the space observation map 30 (Steps S5 and S7), and generates the third feature maps 42 (Steps S8 and S10).

In the second embodiment, the fourth generating unit 13D performs weighting of the sixth combined map 22 using the space observation map 30 (Steps S5 and S7), and generates a seventh combined map 43 (Step S8). Then, the fourth generating unit 13D generates the third feature maps 42 using the seventh combined map 43 (Step S10).

For example, with respect to the feature quantity of each element FB included in the sixth combined map 22, the fourth generating unit 13D performs weighting according to the second weighting value defined in the corresponding element FC in the space observation map 30.

More specifically, to the feature quantity of each element FB included in the sixth combined map 22, the fourth generating unit 13D adds or multiplies the second weighting value of the corresponding FC in the space observation map 30. The element FC corresponding to the element FB implies that the pixel position is same in the input image 18 used as the source for calculation. Herein, the explanation is given for an example of multiplying the second weighting value. Then, the fourth generating unit 13D obtains the multiplication result as the post-weighting feature quantity of each element FB of the sixth combined map 22. The fourth generating unit 13D performs the identical operation with respect to all elements FB of the sixth combined map 22, and generates the seventh combined map 43.

Figure 8D:
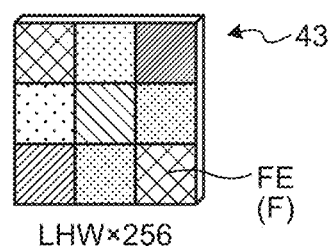
FIG. 8D is a schematic diagram illustrating a seventh combined map.

FIG. 8D is a schematic diagram illustrating an example of the seventh combined map 43. The seventh combined map 43 is configured from a plurality of elements FE corresponding to the elements FB included in the sixth combined map 22. That is, each element FE of the seventh combined map 43 corresponds to one of the element groups of the elements FD corresponding among a plurality of first feature maps 40. Hence, the seventh combined map 43 is an LHW×256 tensor. Moreover, the elements FE constituting the seventh combined map 43 are defined to have the feature quantities obtained after the weighting has been performed using the space observation map 30.

Returning to the explanation with reference to FIG. 8A, the fourth generating unit 131) transforms the seventh combined map 43 into L×H×W×256, and divides the seventh combined map 43 into a plurality of third feature maps 42 (Step S10).

Figure 8E:
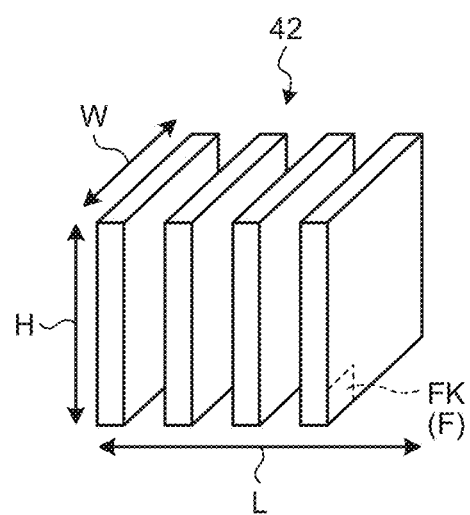
FIG. 8E is a schematic diagram illustrating the third feature maps.

FIG. 8E is a schematic diagram illustrating an example of the third feature maps 42. Herein, elements FK constituting the third feature maps 42 are defined to have values obtained by correcting the feature quantities of the elements FD of the first feature maps 40 using the space observation map 30. In other words, from among the elements FK constituting each of a plurality of third feature maps 42, the feature quantities of the elements FK having a relationship in the second space P2 are higher (greater) than e feature quantities of the other elements FK.

More specifically, the fourth generating unit 13D generates the third feature maps 42 using Equation (4) given below.

$$y_j = \sum_{i=1}^{N} \alpha_{j,i} h(x_i) \quad (4)$$

In Equation (4), "y" represents the value of the element FE of the seventh combined map 43. Moreover, $\alpha_{j,i}$, j, and i are identical to Equation (3). Furthermore, $h(x_i)$ represents the value of the element FB of the sixth combined map 22.

For each element FB of the sixth combined map 22, the fourth generating unit 13D substitutes the feature quantity of the concerned element FB and calculates the post-weighting feature quantity for each element FE of the seventh combined map 43. The fourth generating unit 13D performs this operation for each element FE, and generates the seventh combined map 43 in which the post-weighting feature quantity is defined for each element FE. Then, the fourth generating unit 13D transforms the seventh combined map 43 into L×H×W×256, and generates a plurality of third feature maps 42.

Meanwhile, as illustrated in FIG. 8A, the fourth generating unit 13D can generate the third feature maps 42 by adding, to the seventh combined map 43, the feature quantities defined in the first feature maps 40 (Steps S9 and S10).

In this way, the fourth generating unit 13D can generate a plurality of third feature 43 and the feature quantity of each element FD of the first feature maps 40 to the corresponding element F (Steps S9 and S10).

Then, the fourth generating unit 13D can transform the seventh combined map 43, which is obtained after the addition of the feature quantities of the first feature maps 40, into L×H×W×256, and can divide the seventh combined map 43 into a plurality of third feature maps 42.

In this way, the fourth generating unit 13D can further add the feature quantities of the first feature maps 40 to the seventh combined map 43, and thus can generate a plurality of third feature maps 42 in which the feature quantities of the pre-linear-embedding first feature maps 40 are added.

Returning to the explanation with reference to FIG. 6, given below is the explanation about of the first generating unit 13E and the second generating unit 13F.

The first generating unit 13E and the second generating unit 13F generate the second feature maps 48 in an identical manner to the first generating unit 12C and the second generating unit 12D, respectively, except for the fact the third feature maps 42 are used in place of the first feature maps 40.

Figure 9:
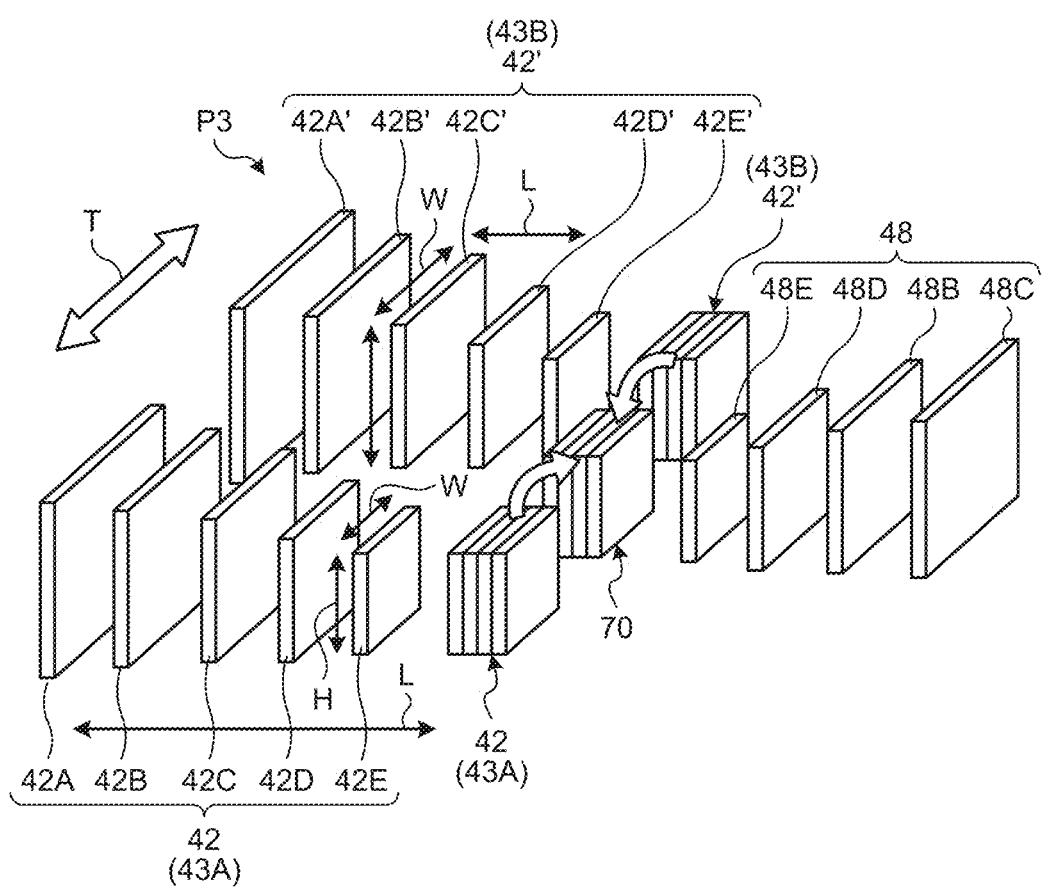
FIG. 9 is an outline diagram illustrating the operations performed by a first generating unit and a second generating unit.

FIG. 9 is an outline diagram illustrating the operations performed by the first generating unit 13E and the second generating unit 13F according to the second embodiment.

In the second embodiment, the first generating unit 13E generates a time observation map 70 using a third group 43A, which is a group of the third feature maps 42 generated in this instance, and a fourth group 43B, which is a group of the third feature maps 42' generated in the past. Then, using the time observation map 70, the second generating unit 13F performs weighting of the third feature maps 42 (or the third feature maps 42') included in the third group 43A (or the fourth group 43B); and generates the second feature maps 48.

FIG. 10A is an explanatory diagram illustrating an example of the generation of the time observation map 70 and the generation of the second feature maps 48.

The first generating unit 13E generates the time observation map 70 in an identical manner to the first generating unit 12C according to the first embodiment, except for the fact that the third feature maps 42 are used as the first feature maps 40.

More specifically, the first generating unit 13E generates the time observation map 70 based on the third group 43A, which is a group of the third feature maps 42 generated in this instance by the fourth generating unit 13D, and the fourth group 43B, which is a group of the third feature maps 42' generated in the past by the fourth generating unit 13D. Herein, the third feature maps 42 as well as the third feature maps 42' represent "third feature maps" generated at different calculation timings by the fourth generating unit 13D.

Figure 10B:
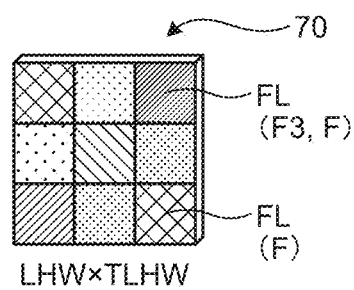
FIG. 10B is a schematic diagram illustrating the time observation map.

FIG. 10B is a schematic diagram illustrating an example of the time observation map 70. The time observation map 70 is a map in which the elements having a closer relationship in the time direction T (see FIG. 10A) among the third group 43A and the fourth group 43B are defined to have a proportionally high third-weighting value. More specifically, in the time observation map 70, the elements F having a closer relationship in the time direction T are defined to have a proportionally high third weighting value. In other words, it can be said that the time observation map 70 is a map in which the elements F having a closer relationship in a third space P3 are defined to have a proportionally high third weighting value.

As illustrated in FIG. 9, the third space P3 is a multidimensional space defined by the first position direction H, the second position direction W, the relationship direction L, and the time direction T.

As described earlier, the third feature maps 42 are generated using the space observation map 30. Moreover, as described earlier, the second space P2 is a three-dimensional space defined by the first position direction H, the second position direction W, and the relationship direction L.

The time observation map 70 is generated using the third feature maps 42. Hence, as illustrated in FIG. 9, in the time observation map 70, the elements having a closer relationship in the third space P3 are defined to have a proportionally high third weighting value. For that reason, as illustrated in FIG. 10B, the time observation map 70 represents an LHW×TLHW tensor. Herein, T represents the time direction T. For example, T can be expressed as the number of input images 18 (number of frames) photographed at different timings.

In the second embodiment, the first generating unit 13E implements the method described below and generates the time observation map 70 from the third feature maps 42 belonging to the third group 43A and from the third feature maps 42' belonging to the fourth group 43B.

More specifically, the first generating unit 13E calculates the inner product result of the vector sequence of the feature quantities along each of the time direction T, the relationship direction L, and the position directions (the first position direction H and the second position direction W). In the example illustrated in FIG. 10A, there are 256 types of feature quantities.

Then, the first generating unit 13E generates the time observation map 70 in which the inner product result of each element FK is defined as the third weighting value for one element FG (see FIG. 10B).

Alternatively, the first generating unit 13E can generate the time observation map 70 using a combined map in which the third feature maps 42 belonging to the third group 43A and the third feature maps 42' belonging to the fourth group 43B are linearly embedded.

More specifically, as illustrated in FIG. 10A, for example, the first generating unit 13E generates a seventh combined map 71 in which, for each element group of the elements FK corresponding among the third feature maps 42 (a third feature map 42B to a third feature map 42E), the feature quantity of each element FK included in the concerned element group is linearly embedded (Step S30).

An element group of the elements FK corresponding among a plurality of third feature maps 42 implies that the pixels of the input image 18, which represents the source for calculating the elements FK belonging to the concerned element group, are the pixels at the same pixel positions. That is, the elements FK belonging to the concerned element group are generated from the pixels at the same pixel positions in the input image 18, and are the elements FK of mutually different third feature maps 42.

Figure 10C:
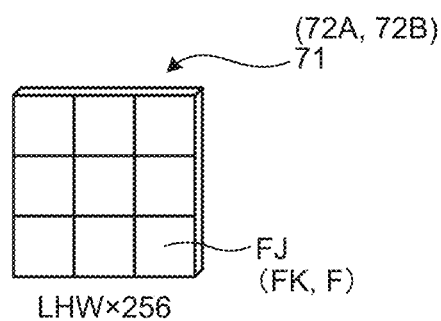
FIG. 10C is a schematic diagram illustrating a seventh combined map.

FIG. 10C is a schematic diagram illustrating an example of the seventh combined map 71. Herein, elements FJ constituting the seventh combined map 71 are configured from a group of the elements FK of the third feature maps 42. Hence, the seventh combined map 71 represents an LHW×256 tensor. Herein, L corresponds to the relationship direction L explained earlier, H corresponds to the first position direction H explained earlier, and W corresponds to the second position direction W explained earlier. Moreover, for each element group of the elements FK corresponding among a plurality of third feature maps 42, the feature quantity of each element FJ included in the seventh combined map 71 represents the value obtained by linear embedding of the feature quantities of the elements FK included in the concerned element group.

In the second embodiment, the first generating unit 13E can generate the seventh combined map 71 by implementing a known linear embedding method.

Returning to the explanation with reference to FIG. 10A, the first generating unit 13E generates an eighth combined map 72A and a ninth combined map 72B using the third feature maps 42' belonging to the fourth group 43B (Steps S31 and S32). The generation of the eighth combined map 72A and the ninth combined map 72B is identical to the generation of the seventh combined map 71, expect for the fact that the third feature maps 42' are used in place of the third feature maps 42. Herein, the first generating unit 13E generates combined maps having different weight values during linear embedding (i.e., generates the eighth combined map 72A and the ninth combined map 72B) from the third feature maps 42' belonging to the fourth group 43B. Hence, the eighth combined map 72A and the ninth combined map 723 have an identical configuration to the seventh combined map 71 as illustrated in FIG. 10C.

Returning to the explanation with reference to FIG. 10A, "x" represents each element group of the elements FK corresponding among the third feature maps 42 or among the third feature maps 42'. Then, the seventh combined map 71, the eighth combined map 72A, and the ninth combined map 72B that are configured from the elements FK of the concerned element group are expressed as functions using the concerned element group "x". More specifically, for example, the seventh combined map 71 is expressed as f(x), the eighth combined map 72A is expressed as g(x), and the ninth combined map 72B is expressed as h(x).

Then, regarding each element FJ corresponding among the seventh combined map 71 and the eighth combined map 72A, the first generating unit 13E generates the time observation map 70 in which the inner product result of the vector sequence of the feature quantities along the time direction T is defined as a third weighting value (Steps S33, S34, and S35). As a result, the time observation map 70 is generated as illustrated in FIG. 10B.

Meanwhile, the first generating unit 13E can use the known Softmax function, and generate the time observation map 70 using Equation (1) given earlier.

For each element FJ corresponding among the seventh combined map 71 and the eighth combined map 72A, the first generating unit 13E substitutes the feature quantity of the concerned element FJ in Equation (1). As a result of performing this operation, the first generating unit 13E generates the third weighting value for each element FL of the time observation map 70. Then, the first generating unit 13E generates the time observation map 70 in which the third weighting value is defined for each element FL. As a result, the time observation map 70 represents a LHW× TLHW tensor (see FIG. 10B).

Returning to the explanation with reference to FIG. 6, with respect to each of a plurality of third feature maps 42 (or third feature maps 42') included in the third group 43A (or the fourth group 43B), the second generating unit 13F performs weighting according to the third weighting values indicated in the time observation map 70; and accordingly generates a plurality of second feature maps 48.

For example, as illustrated in FIG. 10A, the second generating unit 13F makes use of the ninth combined map 723 obtained by combining the third feature maps 42' that belong to the fourth group 43B. More specifically, the second generating unit 13F performs weighting of the ninth combined map 72B using the time observation map 70 (Steps S35 and S36), and generates the second feature maps 48 (Step S37).

For example, with respect to the feature quantity of each element FJ included in the ninth combined map 72B, the second generating unit 13F performs weighting according to the third weighting value defined for the corresponding element FL indicated in the time observation map 70.

More specifically, to the feature quantity of each element FJ included in the ninth combined map 72B, the second generating unit 13F adds or multiplies the third weighting value of the corresponding element FL in the time observation map 70. In the second embodiment, the explanation is given for an example of multiplying the third weighting value. Then, the second generating unit 13F obtains the multiplication result as the post-weighting feature quantity of each element FJ. The second generating unit 13F performs the same operation with respect to all elements FJ in the ninth combined map 72B, and generates a 10th combined map 73.

Figure 10D:
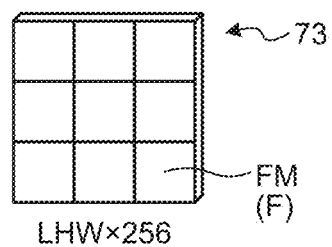
FIG. 10D is a schematic diagram illustrating a 10th combined map.

FIG. 10D is a schematic diagram illustrating an example of the 10th combined map 73. The 10th combined map 73 is configured from a plurality of elements FM, which correspond to the elements FJ included in the ninth combined map 72B. That is, each element FM of the 10th combined map 73 corresponds to one of the element groups of the elements FK corresponding among a plurality of third feature maps 42. Hence, the 10th combined map 73 represents an LHW×256 tensor. Moreover, the elements FM constituting the 10th combined map 73 are defined to have the feature quantities obtained after the weighting has been performed using the time observation map 70.

Then, the second generating unit 13F transforms the 10th combined map 73 into L×H×W×256, and divides the 10th combined map 73 into a plurality of second feature maps 48.

Figure 10E:
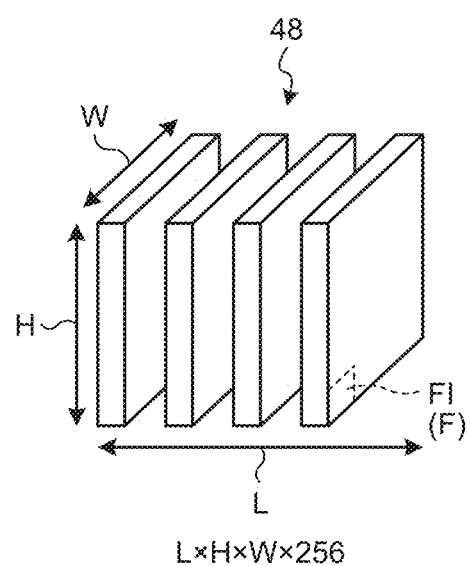
FIG. 10E is a schematic diagram illustrating the second feature maps.

FIG. 10E is a schematic diagram illustrating an example of the second feature maps 48. Herein, the elements FI constituting the second feature maps 48 are defined to have values obtained by correcting the feature quantities of the elements FK of the third feature maps 42 using the time observation map 70. Moreover, in the third feature maps 42, values obtained by correcting the feature quantities of the elements FD of the first feature maps 40 using the space observation map 30 are defined.

Hence, in the second embodiment, each first element FI of a plurality of second feature maps 48 indicates a high feature quantity in proportion to the closer relationship in the third space P3.

In an identical manner to the first embodiment, the second generating unit 13F can generate the second feature maps 48 using Equation (2) given earlier.

However, in the second embodiment, "$y_j$" in Equation (2) represents the value of the element FI of the second feature maps 48. Moreover, a j, and i are identical to Equation (1) given earlier. Furthermore, $h(x_{t-n,i})$ represents the value of the element FK of the ninth combined map 72B.

For each element FJ of the ninth combined map 72B, the second generating unit 13F substitutes the feature quantity of the concerned element FJ in Equation (2) given earlier, and calculates the post-weighting feature quantity of each element FM of the 10th combined map 73. As a result of performing this operation for each element FJ, the second generating unit 13F generates the 10th combined map 73 in which the post-weighting feature quantity is defined for each element FM. Then, the second generating unit 13F transforms the 10th combined map 73 into L×H×W×256, and generates a plurality of second feature maps 48 in which the post-weighting feature quantity is defined for each element FI.

Returning to the explanation with reference to FIG. 6, the detecting unit 13G detects the objects captured in the input image 18 by using the second feature maps 48. The operations performed by the detecting unit 13G are identical to the operations performed by the detecting unit 12E according to the first embodiment.

The output control unit 13H outputs the object detection result, which is obtained by the detecting unit 13G, to the output unit 16. The operations performed by the output control unit 13H are identical to the operations performed by the output control unit 12F according to the first embodiment.

Given below is the explanation of a sequence of operations performed in an object detection operation performed by the object detection apparatus 10B.

FIG. 11 is a flowchart for explaining an exemplary flow of the object detection operation performed by the object detection apparatus 10B.

The obtaining unit 13A obtains the input image 18 (Step S200).

Then, the calculating unit 13B calculates a plurality of first feature maps 40 from the input image 18 obtained at Step S200 (Step S202). For example, the calculating unit 133 uses a CNN and performs a convolution operation in a repeated manner so as to calculate a plurality of first feature maps 40 from the input image 18.

The third generating unit 13C generates the space observation map 30 based on the first feature maps 40 calculated at Step S202 (Step S204).

Subsequently, with respect to the first feature maps 40 calculated at Step S202, the fourth generating unit 13D performs weighting according to the second weighting values indicated in the space observation map 30 generated at Step S204; and generates a plurality of third feature maps 42 (Step S206). Then, the fourth generating unit 13D stores the third feature maps 42 in the memory unit 14.

The first generating unit 13E generates the time observation map 70 using the third group 43A, which is a group of the third feature reaps 42 generated in this instance at Step S206, and using the fourth group 43B, which is a group of the third feature maps 42' generated in the past (Step S208).

Subsequently, with respect to the third feature maps 42 (or the third feature maps) 42° belonging to the third group 43A (or the fourth group 43B), the second generating unit 13F performs weighting according to the third weighting values indicated in the time observation map 70, and generates a plurality of second feature maps 48 (Step S210).

Then, the detecting unit 13G detects the objects captured in the input image 18 by using the second feature maps 48 which are generated at Step S210 (Step S212).

Subsequently, the output control unit 13H outputs the object detection result, which is obtained at Step S212, to the output unit 16 (Step S214). It marks the end of the present routine.

As explained above, the object detection apparatus 10B according to the second embodiment includes the third generating unit 13C, the fourth generating unit 13D, the first generating unit 13E, and the second generating unit 13F.

Based on the first feature maps 40, the third generating unit 13C generates the space observation map 30 in which high second weighting values are defined in proportion to the elements having a closer relationship in the space (the second space P2) that is defined by the position directions (the second position direction W and the first position direction H) in the first feature maps 40 and by the relationship direction L among the first feature maps 40. The fourth generating unit 13D performs weighting with respect to the first feature maps 40 according to the second weighting values indicated in the space observation map 30, and generates a plurality of third feature maps 42. The first generating unit 13E generates the time observation map 70 using the third feature maps 42 as the first feature maps 40. The second generating unit 13F generates the second feature maps 48 using the third feature maps 42 as the first feature maps 40.

In the space observation map 30 used in the object detection apparatus 10B according to the second embodiment, high first weighting values are defined in proportion to the elements having a closer relationship in the second space P2 that is defined by the first position direction H, the second position direction W, and the relationship direction L. In the time observation map 70, high third weighting values are defined in proportion to the elements having a closer relationship in the time direction T.

For that reason, the object detection apparatus 10B according to the second embodiment can perform object detection using the second feature maps 48 that are obtained by increasing the feature quantities of such areas in the first feature maps 40 that are important in the third space P3. As described above, the third space P3 is a multidimensional space defined by the first position direction H, the second position direction W, the relationship direction L, and the time direction T.

Hence, as compared to the conventional technology, the object detection apparatus 10B according to the second embodiment can perform object detection using the second feature maps 48 in which the relationships in the relationship direction L and the time direction T are further taken into account. Thus, as compared to the first embodiment described earlier, the object detection apparatus 10B can perform object detection according to further broader features.

Modification Example

There is no restriction on the targets for application of the object detection apparatuses 10 and 10B according to the embodiments described above. That is, the object detection apparatuses 10 and 10B are implementable in various devices that perform various operations using the detection result about the objects captured in the input image 18.

Figure 12:
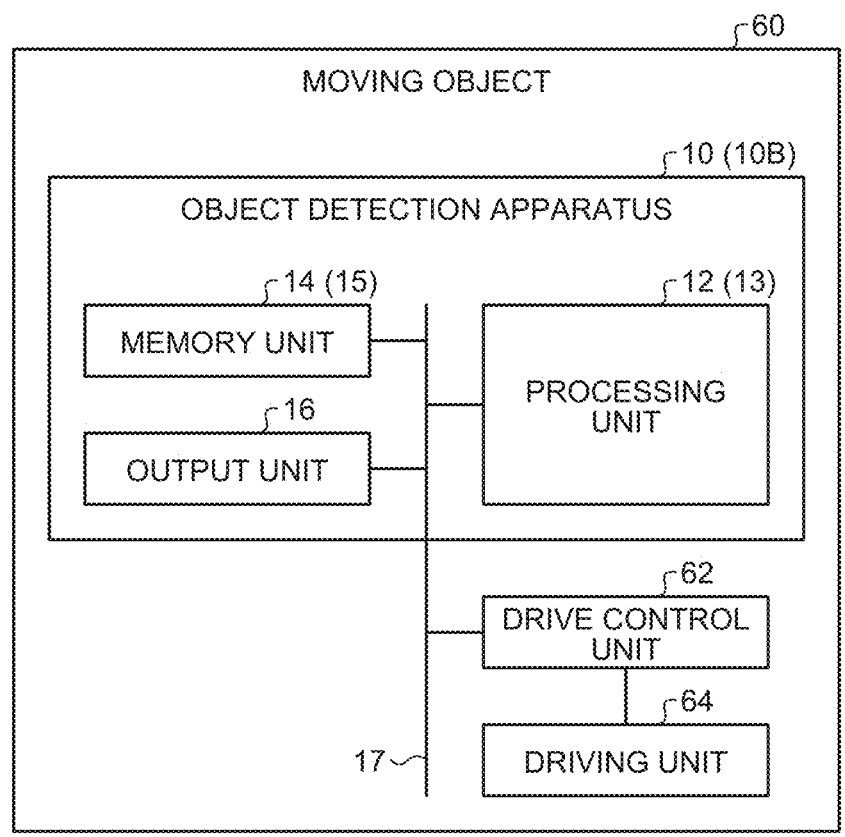
FIG. 12 is a diagram illustrating an application of the object detection apparatus.

FIG. 12 is a diagram illustrating an exemplary application of the object detection apparatuses 10 and 10B. In the example illustrated in FIG. 12, the object detection apparatus 10 or the object detection apparatus 10B is installed in a moving object 60.

The moving object 60 is an object capable of moving when driven. Examples of the moving object 60 include a vehicle (a motorcycle, a four-wheel-drive automobile, or a cycle), a truck, and a robot. For example, the moving object 60 can be a moving object that runs by driving performed by a person, or can be an object capable of running automatically without being driven by a person (capable of autonomous running). In this modification example, the explanation is given about an example of the moving object 60 that is capable of autonomous running.

Meanwhile, the object detection apparatus 10 or the object detection apparatus 10B is not limited to be installed in the moving object 60. Alternatively, the object detection apparatus 10 or the object detection apparatus 10B can be installed in a stationary object. Herein, a stationary object implies an object fixed to the around. Thus, a stationary object is not capable of moving around, or is stationary with respect to the ground. Examples of the stationary object include a parked vehicle and a street sign. Still alternatively, the object detection apparatus 10 or the object detection apparatus 10B can be installed in a cloud server that performs operations in cloud.

The moving object 60 includes the object detection apparatus 10 or the object detection apparatus 10B; a drive control unit 62; and a driving unit 64. The object detection apparatus 10 or the object detection apparatus 10B has an identical configuration to the configuration explained earlier in the corresponding embodiment. The drive control unit 62 and the driving unit 64 are connected to the processing unit 12 or the processing unit 13 via the bus 17 in order to be able to send and receive data and signals.

The driving unit 64 is a driving device installed in the moving object 60. Examples of the driving unit 64 include an engine, a motor, a wheel, and a handle position varying unit.

The drive control unit 62 controls the driving unit 64. Thus, the driving unit 64 performs driving under the control of the drive control unit 62.

For example, the processing unit 12 or the processing unit 13 outputs information indicating the object detection result to the drive control unit 62 too. Then, the drive control unit 62 controls the driving unit 64 by referring to the received information indicating the object detection result. For example, the drive control unit 62 controls the driving unit 64 in such a way that the moving object 60 moves while avoiding any objects indicated in the information indicating the object detection result and while maintaining a distance from the objects. Hence, for example, the drive control unit 62 can control the driving unit 64 in such a way that the moving object 60 performs autonomous running according to the object detection result.

Meanwhile, as the input image 18 used by the processing unit 12 or the processing unit 13, it is possible to use a taken image that is taken by an imaging device installed in the moving object 60 or to use a taken image obtained from an external device.

The target for application of the object detection apparatus 10 or the object detection apparatus 10B according to the corresponding embodiment is not limited to the moving object 60.

Alternatively, for example, the object detection apparatus 10 or the object detection apparatus 10B can be implemented in a detection device that detects the objects captured in a taken image taken by a security camera.

Given below is the explanation of an exemplary hardware configuration of the object detection apparatus 10 and the object detection apparatus 10B according to the embodiments described above.

Figure 13:
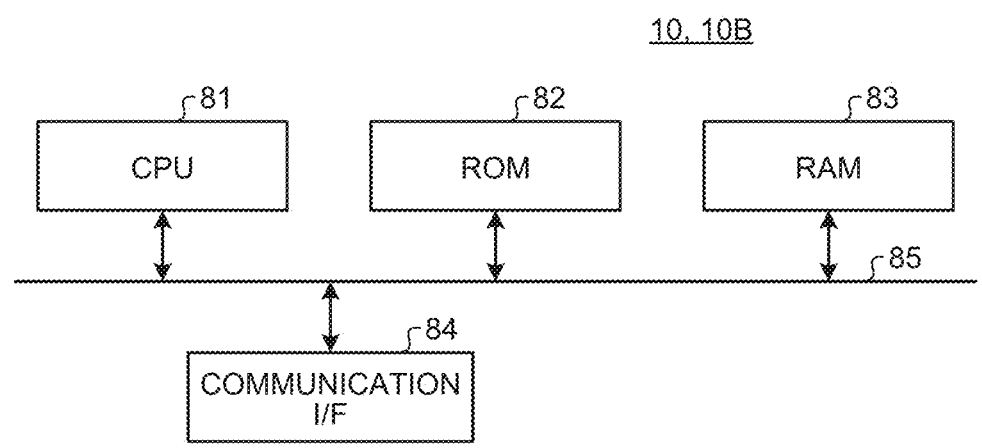
FIG. 13 is a hardware configuration diagram of the object detection apparatus.

In FIG. 13 is illustrated an exemplary hardware configuration diagram of the object detection apparatus 10 and the object detection apparatus 10B according to the embodiments described above.

The object detection apparatus 10 and the object detection apparatus 10B according to the embodiments described above have a hardware configuration of a commonplace computer in which a central processing unit (CPU) 81, a read only memory (ROM) 82, a random access memory (RAM) 83, and an communication interface (I/F) 84 are connected to each other by a bus 85.

The CPU 81 is an arithmetic device that controls the object detection apparatus 10 and the object detection apparatus 10B according to the embodiments described above. The ROM 82 stores computer programs therein, which are used by the CPU 81 to perform various operations. The RAM 83 stores data therein, which is necessary in the various operations performed by the CPU 81. The communication I/F 84 establishes connection with the output unit 16 and the drive control unit 62, and enables transmission and reception of data.

In the object detection apparatus 10 and the object detection apparatus 10B according to the embodiments described above, the CPU 81 reads computer programs from the ROM 82 into the RAM 83 and executes them, so that the above-mentioned functions are implemented in the computer.

Meanwhile, the computer programs meant for performing the various operations in the object detection apparatus 10 or the object detection apparatus 10B according to the corresponding embodiment can be alternatively stored in a hard disk drive (HDD). Still alternatively, the computer programs meant for performing the various operations in the object detection apparatus 10 or the object detection apparatus 10B according to the corresponding embodiment can be stored in advance in the ROM 82.

Still alternatively, the computer programs meant for performing the various operations in the object detection apparatus 10 or the object detection apparatus 10B according to the corresponding embodiment can be recorded as installable files or executable files in a computer-readable memory medium such as a compact disk read only memory (CD-ROM), a compact disk recordable (CD-R), a memory card, a digital versatile disk (DVD), or a flexible disk (FD); and can be provided as a computer program product. Still alternatively, the computer programs meant for performing the various operations in the object detection apparatus 10 or the object detection apparatus 10B according to the corresponding embodiment can be stored in a downloadable manner in a computer connected to a network such as the Internet. Still alternatively, the computer programs meant for performing the various operations in the object detection apparatus 10 or the object detection apparatus 10B according to the corresponding embodiment can be distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An object detection apparatus comprising:
   a hardware processor configured to:
   calculate, from an input image, a plurality of first feature maps, wherein each first feature map of the plurality of first feature maps comprises a plurality of elements and a feature quantity defined for each element of the plurality of elements, in which feature quantities of at least some of the plurality of elements included in the plurality of first feature maps differ and the plurality of first feature maps are calculated using a convolutional neural network (CNN);
   generate, based at least in part on a first group of the plurality of first feature maps calculated at a first time and a second group of the plurality of first feature maps calculated prior to the first time, a time observation map comprising a plurality of elements, in which a first weighting value is defined for each element, wherein the closer the relationship in a time direction between the first group and the second group, the greater the first weighting value;
   generate a plurality of second feature maps by weighting each of the plurality of first feature maps included in the first group or the second group in accordance with first weighting values indicated in the time observation map; and
   detect an object captured in the input image by using the plurality of second feature maps,
   wherein the hardware processor generates the time observation map based on a result of an inner product of the feature quantities defined for each element of the plurality of elements along each of the time direction, a position direction in the plurality of first feature maps, and a relationship direction among the plurality of first feature maps, and wherein the inner product of the feature quantities for each element of the plurality of first feature maps is defined as the first weighting value for each element of the plurality of first feature maps belonging to the first group and the plurality of first feature maps belonging to the second group.

2. The apparatus according to claim 1, wherein the hardware processor calculates the plurality of first feature maps in which at least either resolutions or scales differ.

3. The apparatus according to claim 1, wherein the hardware processor generates the time observation map in which the results of the inner product of the feature quantities defined for each element of the plurality of first feature maps along the time direction are defined as the first weighting value for an element that corresponds between a first combined map and a second combined map,
   the first combined map being a map in which, for each element group of corresponding elements in the plurality of first feature maps included in the first group, each feature quantity of the element included in the element group is linearly embedded in the first combined map,
   the second combined map being a map in which, for each element group of corresponding elements in the plurality of second feature maps included in the second group, each feature quantity of the element included in the element group is linearly embedded in the second combined map.

4. The apparatus according to claim 3, wherein the hardware processor
   generates a third combined map comprising a plurality of elements, in which a weight value during a linear embedding is different than in the first combined map, the third combined map being a map in which a feature quantity of each element thereof included in the element group is linearly embedded for each element group of corresponding elements of the plurality of first feature maps included in the second group, and
   generates a plurality of the second feature maps comprising a plurality of elements by weighting a feature quantity of each element thereof included in the third combined map in accordance with the first weighting values indicated in the time observation map.

5. The apparatus according to claim 1, wherein the hardware processor
generates, based on the plurality of first feature maps, a space observation map in which elements having a closer relationship in a space, which is defined by position directions in the plurality of first feature maps and relationship directions among the plurality of first feature maps, is defined to have proportionally a greater second weighting value,
generates a plurality of third feature maps by weighting each of the plurality of first feature maps in accordance with the second weighting values indicated in the space observation map,
generates the time observation map by using the plurality of third feature maps as the plurality of first feature maps, and
generates the plurality of second feature maps by using the plurality of third feature maps as the plurality of first feature maps,
wherein the relationship direction among the first feature maps indicates increase or decrease direction of resolution or scale.

6. A moving object comprising:
the object detection apparatus according to claim 1; and
a hardware processor configured to control a driving device based on information indicating a detection result of an object.

7. An object detection method implemented by a computer, the method comprising:
calculating, from an input image, a plurality of first feature maps, wherein each feature map of the plurality of first feature maps comprises a plurality of elements and a feature quantity is defined for each element, in which feature quantities of at least some of the plurality of elements included in the plurality of first feature maps differ and the plurality of first feature maps are calculated using a convolutional neural network (CNN);
generating, based at least in part on a first group of the plurality of first feature maps calculated at a first time and a second group of the plurality of first feature maps calculated prior to the first time, a time observation map comprising a plurality of elements, in which a first weighting value is defined for each element, wherein the closer relationship in time direction between the first group and the second group, the greater the first weighting value;
generating a plurality of second feature maps by weighting each of the plurality of first feature maps included in the first group or the second group in accordance with first weighting values indicated in the time observation map; and
detecting an object captured in the input image by using the plurality of second feature maps,
wherein the computer generates the time observation map based on a result of an inner product of the feature quantities defined for each element of the plurality of elements along each of the time direction, a position direction in the plurality of first feature maps, and a relationship direction among the plurality of first feature maps, and wherein the inner product of the feature quantities for each element of the plurality of first feature maps is defined as the first weighting value for each element of the plurality of first feature maps belonging to the first group and the plurality of first feature maps belonging to the second group.

8. A computer program product comprising a non-transitory computer-readable recording medium on which an executable program is recorded, the program instructing a computer to:
calculate, from an input image, a plurality of first feature maps, wherein each feature map of the plurality of first feature maps comprises a plurality of elements and a feature quantity is defined for each element, in which feature quantities of at least some of the plurality of elements included in the plurality of first feature maps differ and the plurality of first feature maps are calculated using a convolutional neural network (CNN);
generate, based at least in part on a first group of the plurality of first feature maps calculated at a first time and a second group of the plurality of first feature maps calculated prior to the first time, a time observation map comprising a plurality of elements, in which a first weighting value is defined for each element, wherein the closer relationship in time direction between the first group and the second group, the greater the first weighting value;
generate a plurality of second feature maps by weighting each of the plurality of first feature maps included in the first group or the second group in accordance with first weighting values indicated in the time observation map; and
detect an object captured in the input image by using the plurality of second feature maps,
wherein the computer generates the time observation map based on a result of an inner product of the feature quantities defined for each element of the plurality of elements along each of the time direction, a position direction in the plurality of first feature maps, and a relationship direction among the plurality of first feature maps, and wherein the inner product of the feature quantities for each element of the plurality of first feature maps is defined as the first weighting value for each element of the plurality of first feature maps belonging to the first group and the plurality of first feature maps belonging to the second group.

* * * * *